(12) United States Patent
Dubelman et al.

(10) Patent No.: US 11,794,412 B2
(45) Date of Patent: Oct. 24, 2023

(54) METHOD AND APPARATUS FOR LAYER THICKNESS CONTROL IN ADDITIVE MANUFACTURING

(71) Applicant: General Electric Company, Schenectady, NY (US)

(72) Inventors: Meredith Elissa Dubelman, Liberty Township, OH (US); Mary Kathryn Thompson, Hamilton, OH (US); Christopher Barnhill, Cincinnati, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 1147 days.

(21) Appl. No.: 16/280,336

(22) Filed: Feb. 20, 2019

(65) Prior Publication Data

US 2020/0262150 A1    Aug. 20, 2020

(51) Int. Cl.
*G06F 19/00* (2018.01)
*B29C 64/393* (2017.01)
(Continued)

(52) U.S. Cl.
CPC .......... *B29C 64/393* (2017.08); *B29C 64/135* (2017.08); *B29C 64/245* (2017.08);
(Continued)

(58) Field of Classification Search
CPC ... B29C 64/393; B29C 64/135; B29C 64/245; B29C 64/268; B33Y 10/00; B33Y 30/00; B33Y 50/02
See application file for complete search history.

(56) References Cited

U.S. PATENT DOCUMENTS

| 4,575,330 A | 3/1986 | Hull |
| 4,752,498 A | 6/1988 | Fudim |

(Continued)

FOREIGN PATENT DOCUMENTS

| CN | 105729812 A | 7/2016 |
| CN | 107322930 | 11/2017 |

(Continued)

OTHER PUBLICATIONS

Hafkamp et al., Mechatronics, 2018, https://doi.org/10.1016/j.mechatronics.2018.02.006, The Netherlands.
(Continued)

*Primary Examiner* — Zhipeng Wang
(74) *Attorney, Agent, or Firm* — Dinsmore & Shohl LLP

(57) ABSTRACT

An additive manufacturing apparatus is disclosed. The apparatus includes a build surface, at least a portion of which is transparent. The apparatus includes a first material depositor operable to deposit a curable resin to form a deposited resin layer on the build surface. A first sensing device is configured to measure the thickness of the deposited resin layer; and wherein the at least one sensing device is configured to generate a signal indicative of the thickness of the deposited resin layer. The first sensing device can be connected to a computer such that the additive manufacturing apparatus is configured to control the thickness of the deposited resin layer. The thickness of the deposited resin layer can be controlled such that it varies from side to side, i.e. across the width of the deposited resin layer in the transverse direction along the x-axis. The thickness can also be controlled such that it varies with time, i.e., in the machine direction along the y-axis.

22 Claims, 22 Drawing Sheets

(51) Int. Cl.
  *B29C 64/245* (2017.01)
  *B29C 64/135* (2017.01)
  *B29C 64/268* (2017.01)
  *B33Y 10/00* (2015.01)
  *B33Y 30/00* (2015.01)
  *B33Y 50/02* (2015.01)

(52) U.S. Cl.
  CPC ............. *B29C 64/268* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,174,931 A | 12/1992 | Almquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,637 A | 8/1993 | Hull |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Saoth et al. |
| 5,807,437 A | 9/1998 | Sachs et al. |
| 5,824,184 A | 10/1998 | Kamijo et al. |
| 5,851,465 A | 12/1998 | Bredt |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,575,218 B1 | 6/2003 | Burns et al. |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,930,144 B2 | 8/2005 | Oriakhi |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,022,207 B2 | 4/2006 | Hirsch |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sano et al. |
| 7,351,304 B2 | 4/2008 | Liang et al. |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,572,403 B2 | 8/2009 | Gu et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,698,947 B2 | 4/2010 | San |
| 7,706,910 B2 | 4/2010 | Hull et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,282,866 B2 | 10/2012 | Hiraide |
| 8,326,024 B2 | 12/2012 | Sckolnik et al. |
| 8,372,330 B2 | 2/2013 | El-Siblani et al. |
| 8,394,313 B2 | 3/2013 | El-Siblani et al. |
| 8,424,580 B2 | 4/2013 | Anderson et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,646 B2 | 10/2013 | Wang et al. |
| 8,568,649 B1 | 10/2013 | Balistrer et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,873,024 B2 | 10/2014 | Jamar et al. |
| 8,876,513 B2 | 11/2014 | Lim et al. |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napadensky |
| 8,968,625 B2 | 3/2015 | Tan |
| 8,991,211 B1 | 3/2015 | Arlotti et al. |
| 8,998,601 B2 | 4/2015 | Busato |
| 9,031,680 B2 | 5/2015 | Napadensky |
| 9,064,922 B2 | 6/2015 | Nakajima et al. |
| 9,067,359 B2 | 6/2015 | Rohner et al. |
| 9,067,361 B2 | 6/2015 | El-Siblani |
| 9,073,260 B2 | 7/2015 | El-Siblani et al. |
| 9,101,321 B1 | 8/2015 | Kiesser |

(56) References Cited

U.S. PATENT DOCUMENTS

| | | |
|---|---|---|
| 9,150,032 B2 | 10/2015 | Roof et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,821,546 B2 | 11/2017 | Schaafsma et al. |
| 9,862,146 B2 | 1/2018 | Driessen et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 10,000,023 B2 | 6/2018 | El-Siblani et al. |
| 10,011,076 B2 | 7/2018 | El-Siblani et al. |
| 2003/0180171 A1 | 9/2003 | Artz et al. |
| 2008/0063867 A1 | 3/2008 | Schlienger et al. |
| 2008/0170112 A1 | 7/2008 | Hull et al. |
| 2009/0304952 A1* | 12/2009 | Kritchman ............ B33Y 10/00 427/256 |
| 2010/0003619 A1 | 1/2010 | Das et al. |
| 2011/0089610 A1 | 4/2011 | El-Siblani et al. |
| 2012/0195994 A1 | 8/2012 | El-Siblani et al. |
| 2012/0007287 A1 | 12/2012 | Vermeer et al. |
| 2013/0140741 A1 | 6/2013 | El-Siblani et al. |
| 2014/0048970 A1 | 2/2014 | Batchelder et al. |
| 2014/0103581 A1 | 4/2014 | Das et al. |
| 2014/0239554 A1 | 8/2014 | El-Siblani |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2015/0004042 A1 | 1/2015 | Nimal |
| 2015/0056365 A1 | 2/2015 | Miyoshi |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0145174 A1 | 5/2015 | Comb |
| 2015/0165695 A1 | 6/2015 | Chen et al. |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0301517 A1 | 10/2015 | Chen et al. |
| 2015/0306825 A1 | 10/2015 | Chen et al. |
| 2015/0321421 A1 | 11/2015 | Ding |
| 2015/0355553 A1 | 12/2015 | Allanic |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0082671 A1 | 3/2016 | Joyce |
| 2016/0096332 A1 | 4/2016 | Chen et al. |
| 2016/0107340 A1 | 4/2016 | Joyce |
| 2016/0107387 A1 | 4/2016 | Ooba et al. |
| 2016/0129631 A1 | 5/2016 | Chen et al. |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0303798 A1 | 10/2016 | Mironets et al. |
| 2016/0332386 A1 | 11/2016 | Kuijpers |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0355135 A1 | 12/2017 | Tombs |
| 2018/0001567 A1 | 1/2018 | Juan et al. |
| 2018/0004192 A1 | 1/2018 | Perret et al. |
| 2018/0029296 A1* | 2/2018 | Van Esbroeck ....... B29C 64/286 |
| 2018/0065302 A1 | 3/2018 | Arai et al. |
| 2018/0200948 A1 | 7/2018 | Kuijpers et al. |
| 2018/0229436 A1 | 8/2018 | Gu et al. |

(56) References Cited

U.S. PATENT DOCUMENTS

| | | | |
|---|---|---|---|
| 2018/0264737 A1 | 9/2018 | Puigardeu et al. | |
| 2018/0272608 A1 | 9/2018 | Yun | |
| 2018/0333913 A1* | 11/2018 | Lin | B29C 64/264 |
| 2018/0361666 A1 | 12/2018 | Adzima | |

FOREIGN PATENT DOCUMENTS

| | | |
|---|---|---|
| CN | 107529489 A | 1/2018 |
| CN | 108349160 A | 7/2018 |
| EP | 3388221 A2 | 10/2018 |
| JP | 10138349 A | 5/1998 |
| JP | 2002370286 | 12/2002 |
| JP | 2003039564 | 2/2003 |
| JP | 2004257929 | 9/2004 |
| JP | 2017007321 A | 1/2017 |
| WO | 9806560 | 2/1998 |
| WO | 2006077665 | 7/2006 |
| WO | 2017009368 | 1/2017 |

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachines. Article May 11, 2017, Micromachines, Seoul University, Seoul, Korea.

International Search Report and Written Opinion in International Application No. PCT/US2020/018645 completed Jun. 15, 2020.

* cited by examiner

METHOD AND APPARATUS FOR LAYER THICKNESS CONTROL IN ADDITIVE MANUFACTURING

BACKGROUND OF THE INVENTION

This invention relates generally to additive manufacturing, and more particularly to an apparatus and method for determining layer thickness in additive manufacturing.

Additive manufacturing is a process in which material is built up layer-by-layer to form a component. One prior art method is a tape casting process. In this process, a resin is deposited as a layer having a desired thickness onto a flexible radiotransparent tape that is fed out from a supply reel. An upper plate lowers onto the resin, compressing it between the tape and the upper plate and defining a layer thickness. Radiant energy is used to cure the resin through the radiotransparent tape. Once the curing of the first uncured layer is complete, the upper plate is retracted upwards, taking the cured material with it. The tape is then advanced to expose a fresh clean section, ready for additional resin to be deposited in a subsequent, new cycle.

Another prior art method employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

One problem with conventional methods of additive manufacturing is that the actual thickness of the deposited layer can vary both within a given layer of a given cycle and from cycle to cycle relative to an actual thickness. Such variation in the thickness of the deposited layer of additive manufacturing material, or resin, can result in a variety of problems and defects.

Another problem with conventional methods of additive manufacturing is that photopolymer cure in response to light or radiation and the penetration depth of the light or radiation into the resin is often greater than the desired layer thickness. In some cases, the penetration depth (Dp) can be 5 to 10 times greater than the desired layer thickness. Cured or partially cured resin transmits more light or radiation than uncured resin. This often results in a phenomenon known as "print-through" in which light penetrates through existing features to unintentionally and undesirably cure resin. Print-through makes the creation of thin internal structures difficult. These internal structures define at least partial voids and can be overhangs, channel walls, ribs, and other geometric features.

Conventionally, print-through is addressed by a technique known as "Z compensation". Z compensation involves carefully controlling layer thickness, curing energy (and therefore cured depth), and intentionally omitting printing specific layers. The steps are done in anticipation that print-through from later layers will occur and thus create the desired cured geometry. However, Z-compensation does not provide for precise control of individual layers and can result in manufacturing inefficiencies.

BRIEF DESCRIPTION OF THE INVENTION

At least one of these problems is addressed by an additive manufacturing apparatus configured to deposit resin for additive manufacturing to form a deposited layer in which the thickness of the deposited layer is monitored. Methods are also provided for closed-loop control of the thickness of the deposited layer across the width of the layer and along the length of the layer.

According to one aspect of the technology described herein, an additive manufacturing apparatus includes a build surface, at least a portion of which is transparent. The apparatus includes a first material depositor operable to deposit a curable resin to form a deposited resin layer on the build surface. A first sensing device is configured to measure the thickness of the deposited resin layer; and wherein the at least one sensing device is configured to generate a signal indicative of the thickness of the deposited resin layer. The first sensing device can be connected to a computer such that the additive manufacturing apparatus is configured to control the thickness of the deposited resin layer. The thickness of the deposited resin layer can be controlled such that it varies from side to side, i.e. across the width of the deposited resin layer in the transverse direction along the x-axis. The thickness can also be controlled such that it varies with time. Stated another way, the thickness can be controlled such that it varies in the machine direction along the y-axis.

According to another aspect of the technology described herein, a method for producing a component layer-by-layer using an additive manufacturing apparatus includes the steps of maintaining the thickness of a layer of resin for additive manufacturing at a predetermined thickness by the following steps: using a first material depositor to deposit a curable resin to form a deposited resin layer on a build surface, at least a portion of which is transparent; sensing the thickness of the deposited resin layer; adjusting the thickness of the deposited resin layer to define a region of the deposited layer that has a predetermined thickness; and positioning the region of the deposited layer having a predetermined thickness in a build zone. The method then includes the step of executing a build cycle, and this step includes the steps of: positioning a stage relative to the build surface so as to define a layer increment in the deposited resin layer having a predetermined thickness; selectively curing the resin using an application of radiant energy in a specific pattern so as to define the geometry of a cross-sectional layer of the component; moving the build surface and the stage relatively apart so as to separate the component from the build surface; introducing new resin into the build zone; and repeating the steps of maintaining the thickness and executing the build cycle for a plurality of layers until the component is complete.

According to yet another aspect of the technology disclosed herein, a method for using an apparatus for additive manufacturing to produce a three dimensional part that includes a void includes the following steps: A) depositing an uncured layer of resin that defines a resin surface and a resin base that are spaced apart a thickness and wherein the uncured layer of resin includes multiple thicknesses such that a first uncured layer profile is defined; and B) curing the layer of resin to create a build layer that is a component of the part. The build layer has a build layer profile that defines at least a portion of the void.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
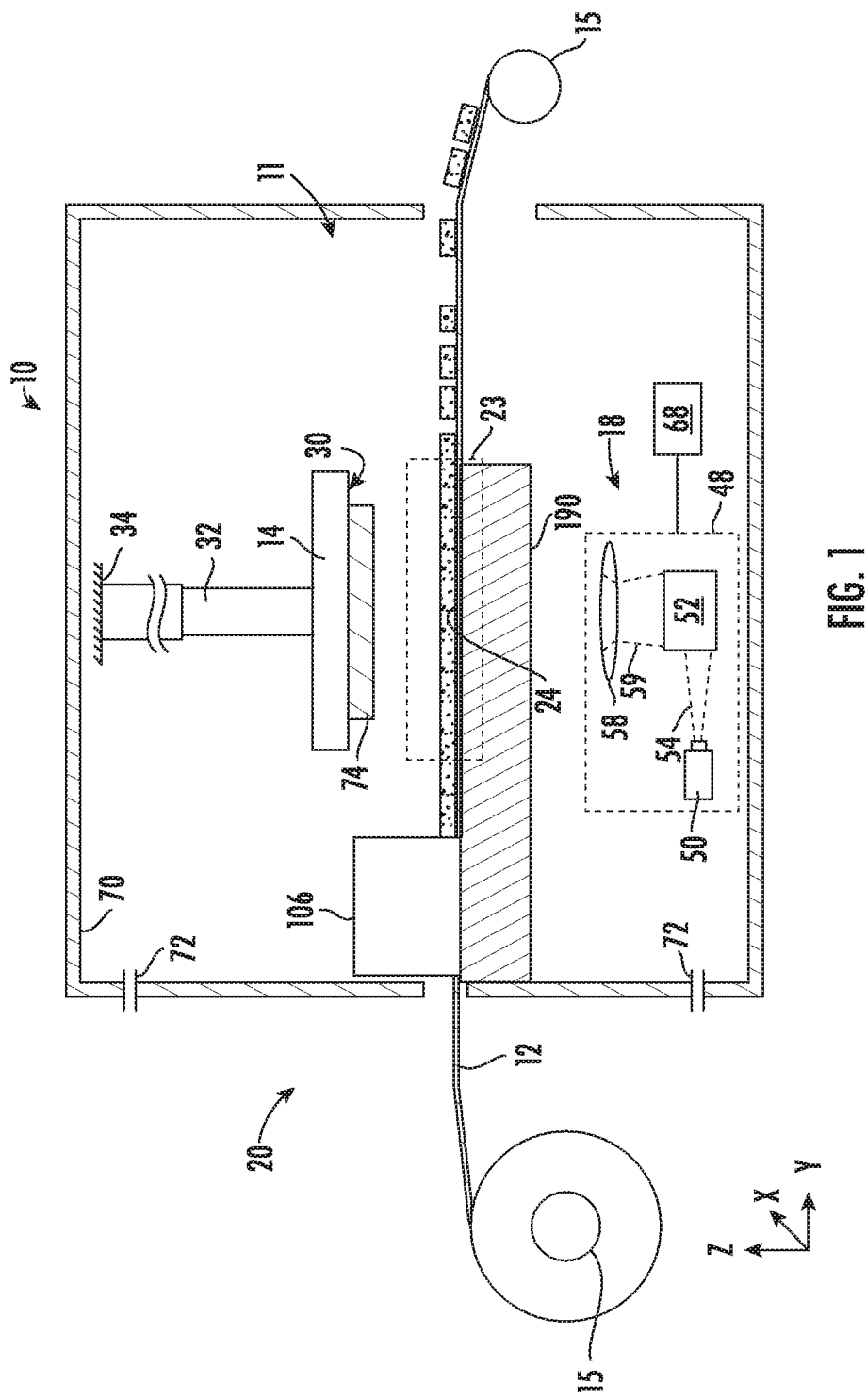
FIG. 1 is a schematic side elevation view of an exemplary tape casting additive manufacturing apparatus that includes a material depositor.

Referring to the drawings wherein identical reference numerals denote the same elements throughout the various views, FIG. 1 illustrates schematically an example of one type of suitable apparatus 10 for additive manufacturing with improved layer control. Apparatus 10 utilizes a resin handling assembly 11 which, according to the illustrated embodiment, is a tape casting device 20. Resin handling assembly 11 is suitable for and benefits from the use of a device for measuring thickness of the deposited layer of resin. It should be appreciated that resin handling assembly 11 is an apparatus configured for a single-layer process. As described herein, tape casting is a single-layer process. As described herein, the use of a plate as a resin substrate in lieu of a tape (i.e. "plate casting") is also a single-layer process. For vat processing, a single-layer process can be performed when a vat is filled only to a depth that provides a single layer of resin or when the part is positioned relative to the vat and uncured resin to define a single layer of resin.

Figure 3:
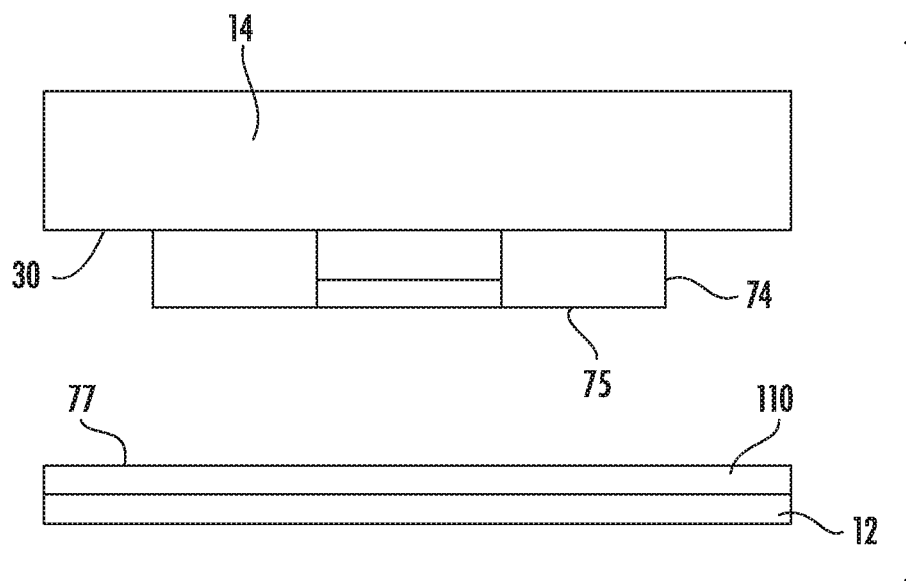
FIG. 3 shows a stylized representation of the initial relative positions of a stage and platform in an additive manufacturing apparatus.

Referring to FIGS. 3-8, the disclosed technology is suitable for reducing the number and magnitude of errors and imprecise layer development that occur with conventional additive manufacturing apparatuses and methods. As will be described in further detail below, but is being described here in order to detail the errors that the disclosed technology address, an additive manufacturing apparatus includes a stage 14. Referring now to FIG. 3, the stage 14 defines a surface 30 on which a part 74 is formed. When referring to tape casting device 20, the machine direction, i.e., the direction a film 12 travels, is indicated as Y; the transverse direction is indicated as X; and the vertical direction is indicated as Z.

Figure 4:
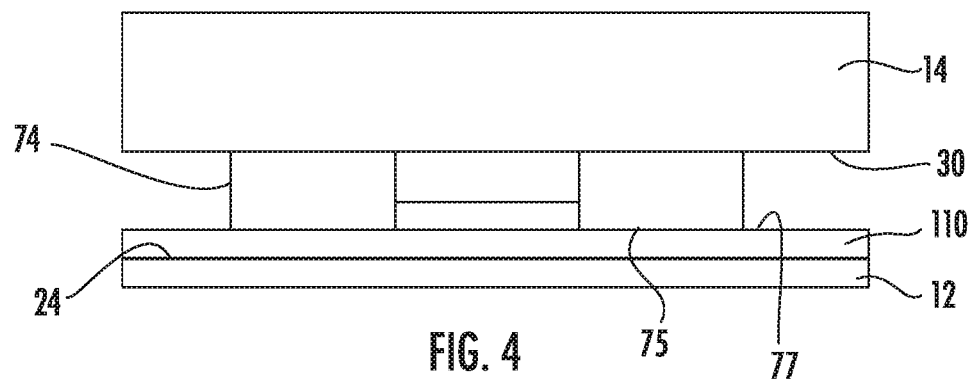
FIG. 4 shows a further relative position of the stage and platform in FIG. 3.
Figure 5:
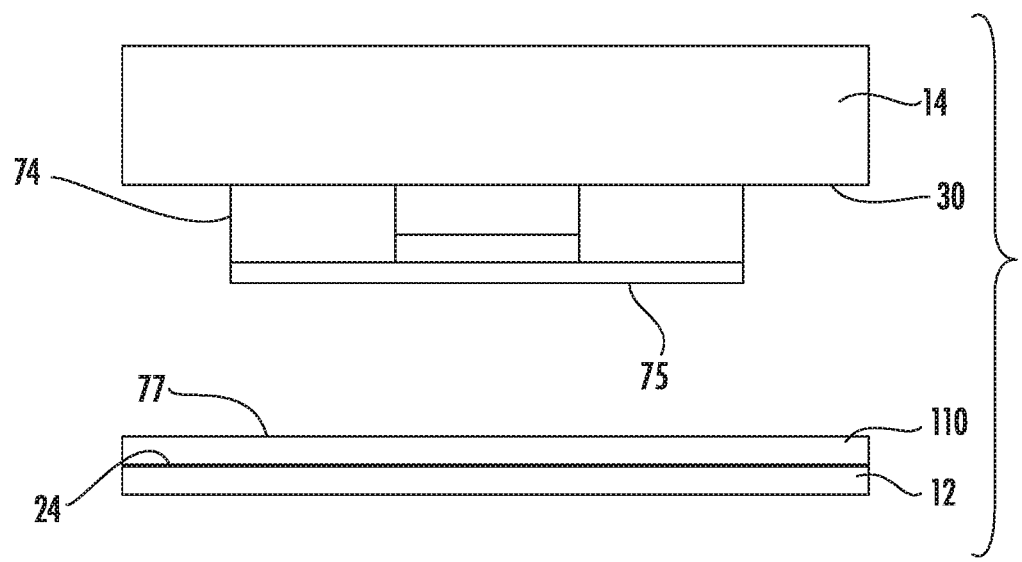
FIG. 5 shows a further relative position of the stage and platform in FIG. 3.

The part 74 defines a surface 75 on which a new layer of the part is added by transfer of a cured portion of a layer 110 of resin positioned adjacent the surface 75 and supported by the film 12 (described in more detail below). The layer 110 defines a surface 77. As shown in FIG. 4, error-free operation involves a predetermined amount of contact between the surface 75 and the surface 77. The predetermined amount of contact results in transfer of a cured portion of the layer 110 to form a new layer of the part 74 and defines a new surface 75. A new portion of layer 110 is moved below the part 74 to define a new surface 77. This configuration is shown in FIG. 5.

Figure 6:
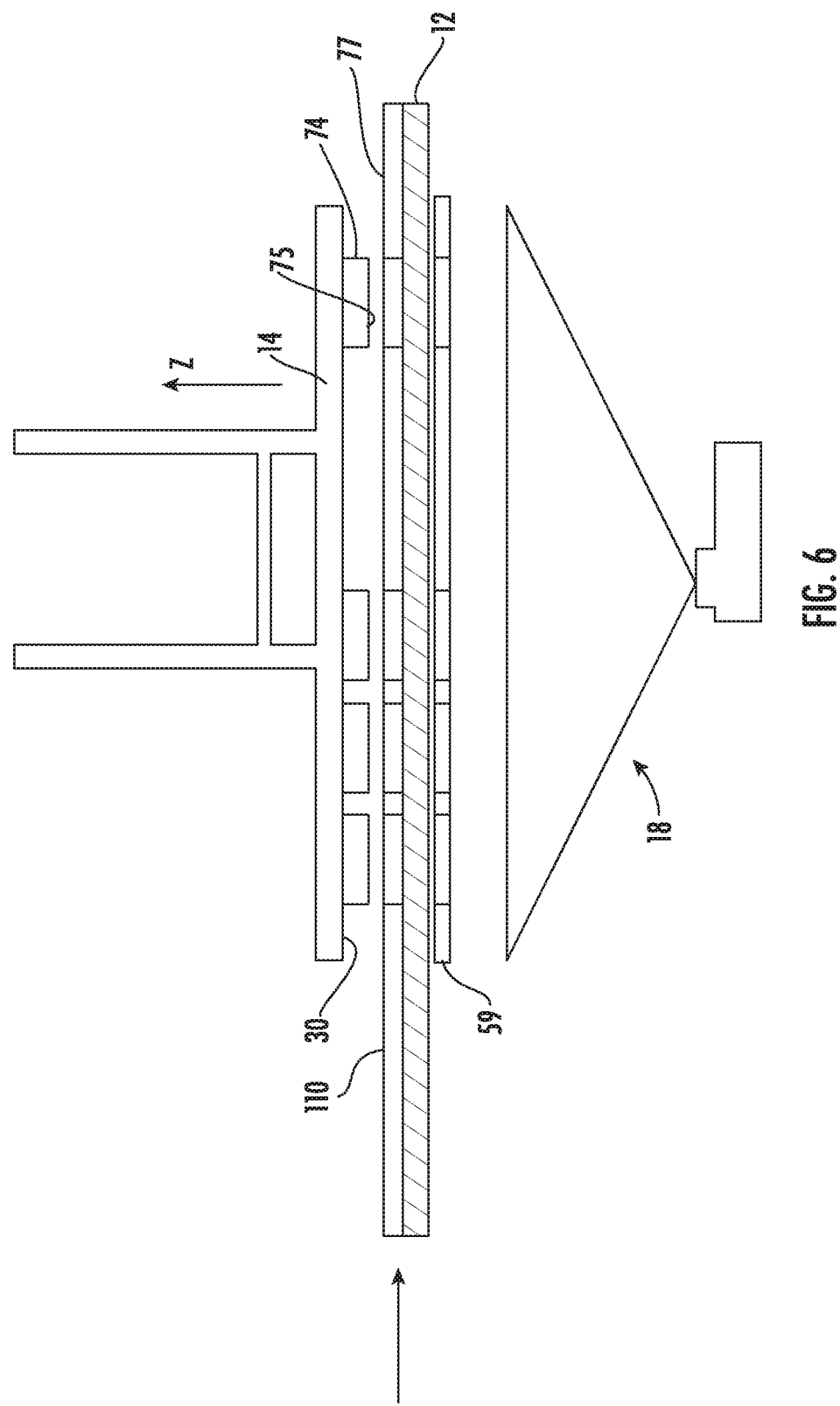
FIG. 6 shows a stylized representation of a failure mode.
Figure 7:
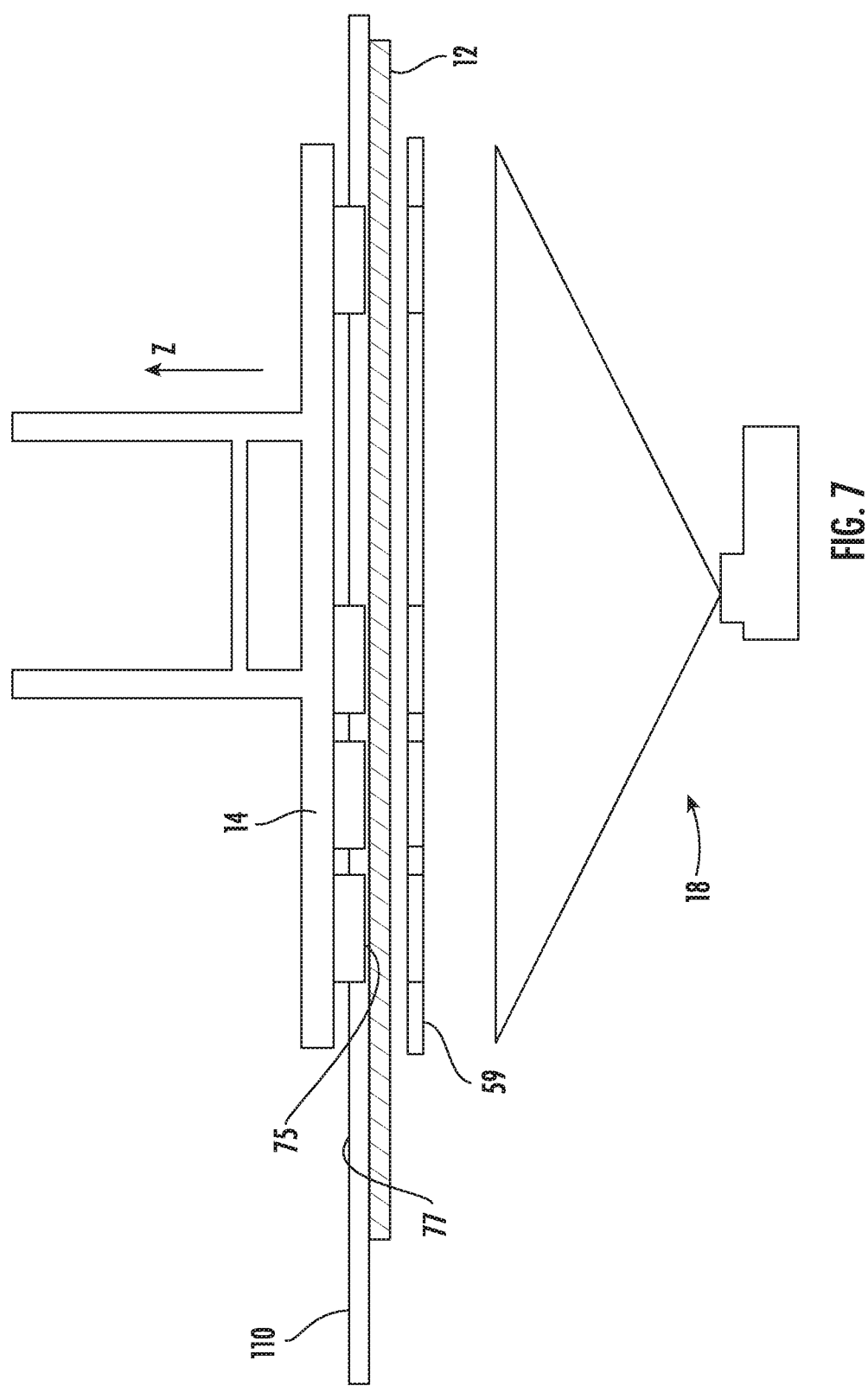
FIG. 7 shows a stylized representation of a failure mode.

There are at least two types of errors that are typical when considering the formation of a single layer. As illustrated in FIG. 6, the layer 110 is not thick enough to allow the surface 77 to contact the surface 75 when the stage 14 and the part 74 are moved into a build position appropriate for the existing geometry of the part 74. In this case, the cured portion of the layer 110 does not transfer to the part 74. In a second error condition, shown in FIG. 7, the layer 110 is too thick such that when the stage 14 and the part 74 are moved into a build position appropriate for the existing geometry of the part 74, the surface 75 actually penetrates the surface 77 causing malformation of the part and potentially also damaging the part.

Figure 8:
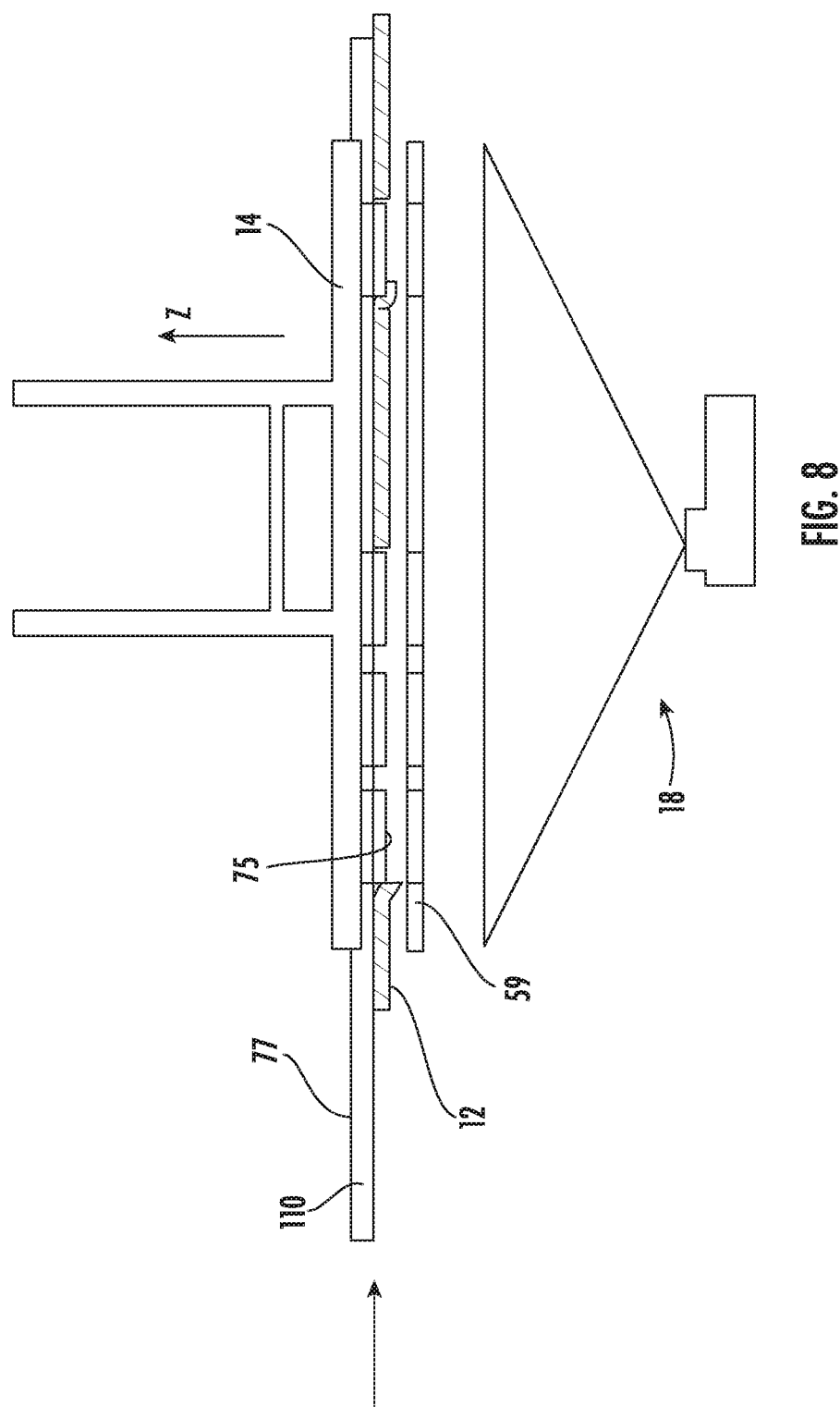
FIG. 8 shows a stylized representation of a failure mode.

There are at least three types of errors that are typical when considering layer-based errors that influence the formation of an entire part. In a third error condition, also shown in FIG. 6, errors in the thickness of previous layers 110 have resulted in a series of layers of part 74, some or all of which are too thin. Thus, the part 74 is not as tall as expected. Thus, when the stage 14 is moved into a build position that is appropriate for the expected geometry, the surface 75 does not contact the material layer 110 if the thickness of material layer 110 is as thick as expected or thinner. In a fourth error condition, also shown in FIG. 7, errors in the thickness of previous layers 100 have resulted in a series of layers, some or all of which are too thick. Thus, the part 74 is taller than expected such that when the stage 14 is moved into a build position that is appropriate for the expected geometry, the surface 75 penetrates the surface 77 causing malformation of or damage to the part. In a fifth error condition, shown in FIG. 8, errors in thickness of previous layers 100 have resulted in a part 74 that is much taller than expected. Thus, when the stage 14 is moved into a build position, the stage 14 is lowered so far such that it "crashes" into the layer 110, damaging the part. It can also push the part 74 through the material layer 110 to contact the film 12 or even to push through the film 12 to damage the machine. As shown in FIG. 8, the film 12 has contacted the part 74 with such force that the film 12 has been separated in several locations resulting in a web breakage or break-out. The disclosed technology addresses these errors by providing an apparatus and method for accurately defining the thickness of the layer 110 to enable the part 74 to be constructed correctly.

It will be understood that configurations of the equipment other than tape casting can be used in apparatus 10 and can carry out a method described below. Those other configurations include different types of resin handling equipment such as vats and/or plates. The method is adaptable for use with lower viscosity resins, slurries, and pastes, as well as higher viscosity resins and/or powders. It will be understood that other configurations of equipment may be used to carry out the method. Basic components of the exemplary apparatus 10 include a material depositing device 106 and a resin handling assembly 11, which in FIG. 1 is a tape casting apparatus 20. The tape casting apparatus 20 includes a support film or tape 12, and a radiant energy apparatus 18.

The tape casting apparatus 20 includes spaced apart rollers 15 with the flexible polymeric tape or foil 12 extending therebetween. A portion of the foil 12 is supported from underneath by a support plate 190. Suitable mechanical supports (frames, brackets, etc.—not shown) would be provided for the rollers 15 and support plate 190. The foil 12 is an example of a "resin support".

Both of the support plate 190 and the foil 12 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 15 in such a manner so as to maintain the foil 12 tensioned between the rollers 15 and to wind the foil 12 from one of the rollers 15 to another roller 15

The foil 12 extending between the rollers 15 defines a first "build surface" 24 which is shown as being planar, but could alternatively be arcuate (depending on the shape of the support plate). For purposes of convenient description, the first build surface 24 may be considered to be oriented parallel to an X-Y plane of the apparatus 10. A direction perpendicular to the X-Y plane is denoted as a Z-direction (X, Y, and Z being three mutually perpendicular directions).

The first build surface 24 may be configured to be "non-stick", that is, resistant to adhesion of cured resin. The non-stick properties may be embodied by a combination of variables such as the chemistry of the foil 12, its surface finish, and/or applied coatings. In one example, a permanent or semi-permanent non-stick coating may be applied. One non-limiting example of a suitable coating is polytetrafluoroethylene ("PTFE"). In one example, all or a portion of the first build surface 24 may incorporate a controlled roughness or surface texture (e.g. protrusions, dimples, grooves, ridges, etc.) with nonstick properties. In one example, the foil 12 may be made in whole or in part from an oxygen-permeable material.

Figure 2:
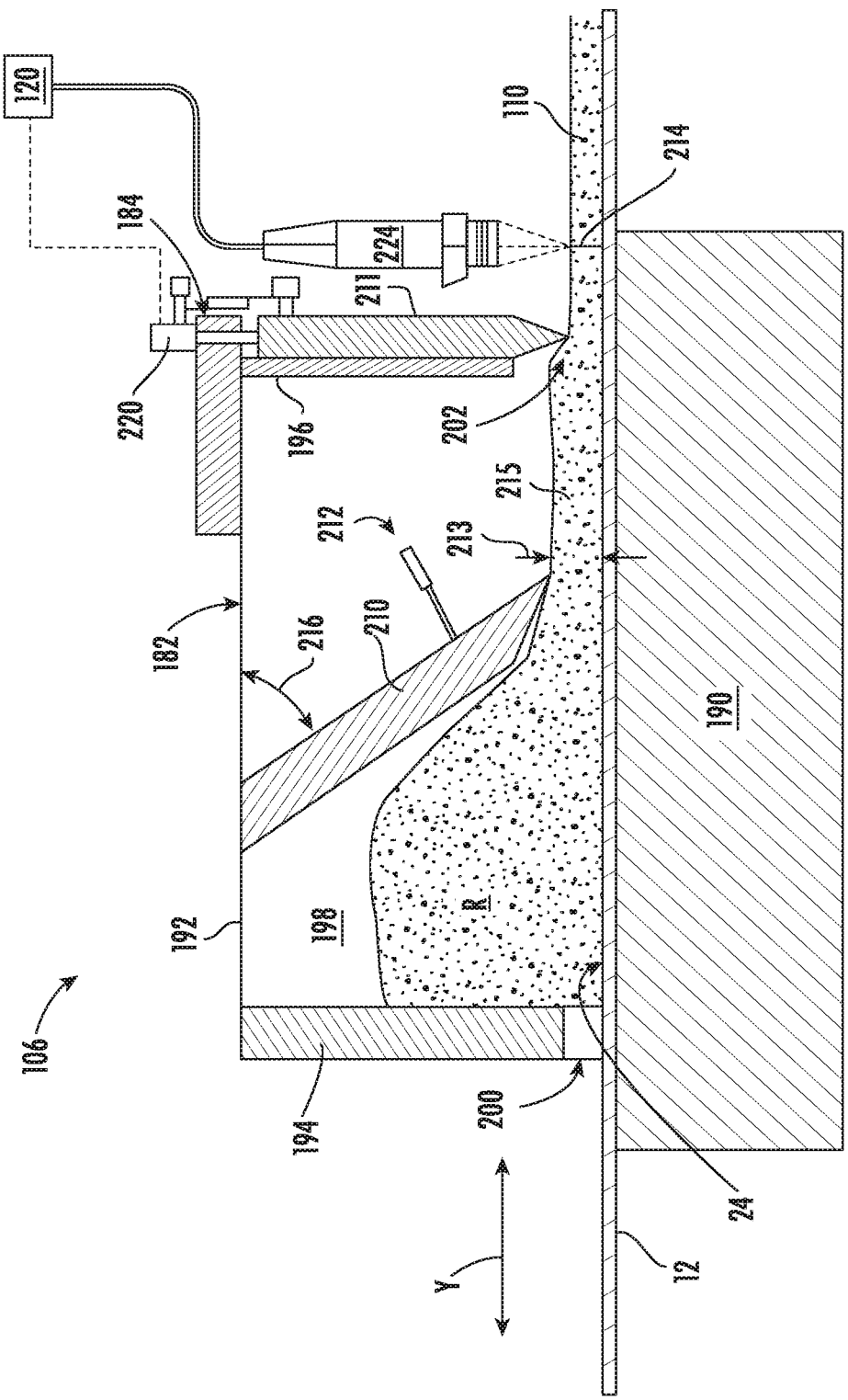
FIG. 2 is a schematic view of one embodiment of the material depositor shown in FIG. 1.

Some means are provided for applying or depositing resin R to the first build surface 24 in a generally uniform layer. FIG. 1 shows schematically the material depositor 106 configured for this purpose. As shown in FIG. 2, the material depositor 106 includes a reservoir 182. The reservoir 182 includes an upstream wall 194 and downstream wall 196 and sidewalls 192. The upstream wall 194 has a slot 200 defined therein to receive the foil 12. The downstream wall 196 defines an aperture or slot 202 that serves as an outlet for the foil 12 and the layer 110 of resin R.

Continuing to refer to FIG. 2, material depositor 106 includes a first doctor blade 210 and a second doctor blade 211 that are used to control the thickness of resin R applied to the foil 12, as the foil 12 passes under the material depositor 106. According to the illustrated embodiment, the thickness of layer 110 is determined by doctor blades. By way of example and not limitation, other material depositing apparatus can be used separately or in combination with the first and second doctor blades 210 and 211 such as: gravure rolls, metering rolls, weir-based cascades, direct die casting, and a combination thereof. The first doctor blade 210 is configured to act as a gross control for the thickness 213 of an initial deposited layer 215. There is provided an adjustment device 212 configured to adjust an angle 216 defined by a surface of the blade 210 and the top edge of wall 192. The greater the angle 216, the lower thickness 213, i.e., the thinner initial deposited layer 215 will be. The adjustment device 212 can be a threaded screw assembly configured to extend and retract the order to affect change in the angle 216. Adjustment device 212 is mechanically linked to the first doctor blade 210.

The second doctor blade 211 is movingly mechanically linked to the downstream wall 196 and can be moved by an actuator 220 to adjust and define the outlet gap 202. A control signal as conventionally known is utilized to controllably connect the actuator 220 with the controller 120. The layer 110 has a thickness 214 that is the distance between the surface of the resin and the base of layer 110 which is in contact with the surface of the foil 12. Accordingly, the thickness 214 of the material layer 110 can be adjusted by a control action such as movement of the doctor blade 211 in response to signals from the controller 120. By way of example and not limitation, suitable control signals can be one of the following: electrical, pneumatic, sonic, electromagnetic, and a combination thereof. By way of example and not limitation, other suitable control actions include: varying the speed of the film 12, adjusting the viscosity or other rheological property of the resin R, changing the width of the deposited material layer 110 such as by the repositioning of side dams (not shown).

Continuing to refer to a FIG. 2, a first sensor 224 is positioned downstream of the second doctor blade 211. The first sensor 224 is configured to determine a thickness 214 of the deposited material layer 110. As a result, the deposited material layer 110 has the thickness 214 as it passes from the material depositor 106 into and through a build zone 23 as shown in FIG. 1. As represented in FIG. 2, the first sensor 224 is configured to generate monitoring signals indicative of the thickness 214 of the deposited material layer 110 and to transmit such signals to the controller 120. By way of example and not limitation, suitable monitoring signals can be one of the following: electrical, pneumatic, sonic, electromagnetic, and a combination thereof.

The controller 120 is configured to receive the monitoring signals and process such signals using predetermined algorithms to generate the control signal discussed above that is subsequently transmitted to the controller 220. In this manner, closed loop control of the thickness 214 of the deposited material layer 110 can be achieved according to the method described below. It should be appreciated that the sensor 224, as illustrated in FIG. 2, is configured to measure the thickness of a single point in the deposited material layer 110. Because the deposited material layer 110 has a width, variations in thickness across the width will not be detected by the sensor 224. Circumstances in which the thickness of the deposited material layer 110 varies across its width are addressed by an embodiment described further below.

Optionally with regards to the method below, when the sensor indicates that the layer 110 is too thin additional resin R can be added to increase the thickness of the layer 110. The additional material can be added via a second depositor (not shown) positioned downstream of the depositor 106. Further optionally, a thin layer 110 can be passed underneath the depositor 106 a second time for additional resin R to be added.

Referring again to components of the apparatus 10 (which are configured to cure and define layers), the stage 14 is a structure defining the planar surface 30 which is capable of being oriented parallel to the build surface 24 of the portion of the film 12 positioned over the support plate 190. Some means are provided for moving the stage 14 relative to the build surface 24, parallel to the Z-direction. In FIG. 1, these means are depicted schematically as a simple actuator 32 connected between the stage 14 and a stationary support structure 34, with the understanding that devices such as pneumatic cylinders, hydraulic cylinders, ball screw electric actuators, linear electric actuators, or delta drives may be used for this purpose. In addition to, or as an alternative to, making the stage 14 movable, the foil 12 and/or the support plate 190 could be movable parallel to the Z-direction.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 59 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other part of the projector 48, with the effect of rastering or shifting the location of the patterned image 59 of the build surface 24. Stated another way, the patterned image may be moved away from a nominal or starting location. This permits a single image forming apparatus 52 to cover a larger build area, for example. Means for mastering or shifting the patterned image from the image forming apparatus 52 are commercially available. This type of image projection may be referred to herein as a "tiled image".

Figure 17:
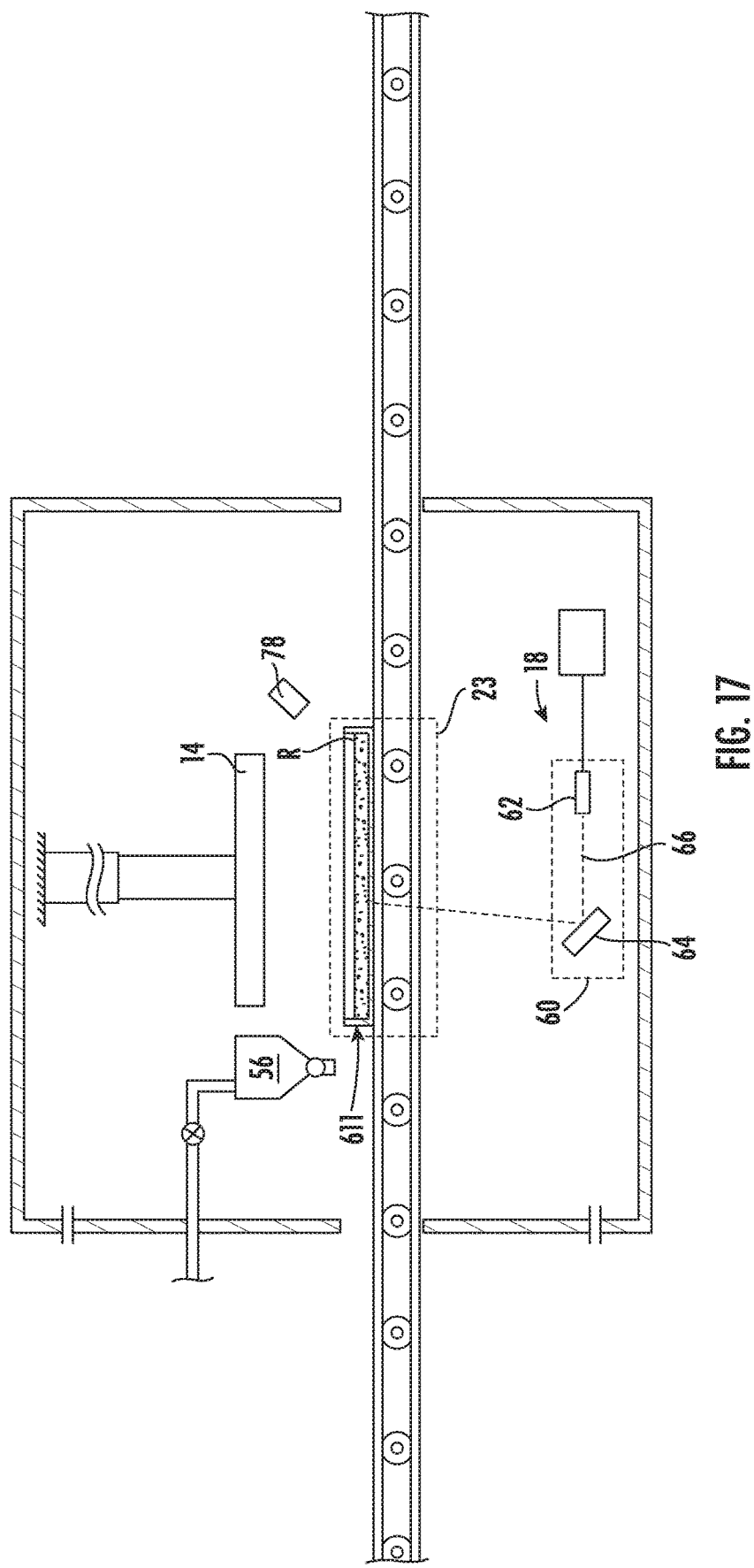
FIG. 17 is a view of the apparatus of FIG. 15 showing an alternative curing mechanism.

In another exemplary embodiment (as shown in FIG. 17 in relation to a vat based resin transport system discussed further below), in addition to other types of radiant energy devices, the radiant energy apparatus 18 may comprise a "scanned beam apparatus" 60 used herein to refer generally to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Non-limiting examples of suitable radiant energy sources include lasers or electron beam guns.

The beam steering apparatus 64 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, the stage 14, the radiant energy apparatus 18, the transport mechanism 20, the depositor 106, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control. It should be appreciated, that in some embodiments the function and capabilities of the controller 120 are implemented in the controller 68.

Optionally, the components of the apparatus 10 may be surrounded by a housing 70, which may be used to provide a shielding or inert gas atmosphere using gas ports 72. Optionally, pressure within the housing 70 could be maintained at a desired level greater than or less than atmospheric. Optionally, the housing 70 could be temperature and/or humidity controlled. Optionally, ventilation of the housing 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

According to the tape casting embodiment shown, the viscosity of the resin R is at a higher viscosity such that contact with a doctor blade or a leveling device (such as the stage 14) is required. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled and there is sufficient resin R to hold together the particles of the filler in the cured state.

Examples of the operation of the apparatus 10 will now be described in detail with reference to FIGS. 1 and 2. It will be understood that, as a precursor to producing a component and using the apparatus 10, the component 74 is software modeled as a stack of planar layers arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

The resin handling assembly 11 is operated to provide new resin R in the build zone 23. After the material is deposited, the apparatus 10 is positioned to define a selected layer increment. The layer increment is defined by some combination of the thickness of the deposited layer and the operation of the stage 14. With regard to the tape casting system 20 it would be the thickness 214 and the operation of the stage 14. For a vat system (discussed below) it would be the depth in the vat to which the resin is filled. For example, the stage 14 could be positioned such that the upper surface 30 for new parts or the existing surface 75 for parts in process is just touching the applied resin R as shown in FIG. 2, or the stage 14 could be used to compress and displace the resin R to positively define the layer increment. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

Once the resin R has been applied and the layer increment defined, the radiant energy apparatus 18 is used to cure a two-dimensional cross-section or layer of the component 74 being built as shown in FIG. 3.

Where a projector 48 is used, the projector 48 projects a patterned image 59 representative of the cross-section of the component 74 through the foil 12 to the resin R. This process is referred to herein as "selective" curing.

Once curing of the first uncured layer is complete, the stage 14 is separated from the foil 12, for example by raising the stage 14 using the actuator 32. The technology disclosed herein provides a method and apparatus for measuring and controlling the thickness of the deposited material, i.e. the layer 110.

Referring now to FIG. 2, as the tape casting apparatus 20 is operated, the film 12 is advanced past the material depositor 106 toward and through the build zone 23. The resin R in the material depositor 106 is dragged, flows, or is pushed from the reservoir 198 and then from the reservoir 182 by the film 12. As the resin R is drawn from the reservoir 198, it passes under the first doctor blade 210 and defines the initial layer 215 having the thickness 213. The thickness 213 is determined by the angle 216 of the first doctor blade 210. The dimensions of the first doctor blade 210 and its mechanical relationship to the reservoir 182 are predetermined such that as the angle 216 approaches 90° the thickness 213 approaches a minimum. Correspondingly, as the angle 216 decreases, i.e., becomes less than 90°, the thickness 213 increases and eventually approaches a maximum. The angle 216 is set using the actuator 212. In the embodiment shown, this is a manual operation that is performed relatively infrequently. The thickness 213 of the layer 215 is chosen such that the final thickness 214 can be achieved by adjusting the position of the second doctor blade 211 to define the dimensions of the gap 202 and thus the thickness 214.

It should be appreciated that the actual relative positions of the second doctor blade 211 and the build surface 24 of the film 12 should correlate to the thickness 214. However, the thickness 214 might differ from the height of the gap 202 due to various factors, including but not limited to: the speed of the film 12; the rheological and mechanical properties of the resin R; the chemical properties and resulting interactions between the resin R and the material that forms the film 12 and the second doctor blade 211; and a combination thereof.

Continuing to refer to FIG. 2, the sensor 224 operates to measure the thickness 214 and generates a measuring signal indicative of the thickness 214, and transmits it to the controller 120. The controller 120 is configured to compare the thickness 214 as determined by the sensor 224, to a predetermined thickness value or "set point." If necessary, the controller 120 then generates a control signal that activates actuator 220 such that the position of the second doctor blade 211 is changed relative to the reservoir 182; thus, changing the dimensions of the gap 202 and the thickness 214. The sampling rate of the sensor 224 and the rate of incremental actions by the controller 120 are determined such that a stable and useful continuous control of the thickness 214 is maintained as the film 12 is moved between the rollers 15. Thus, a region having a desired thickness is defined and the portion of the deposited material layer 110 in build zone 23 is maintained at the desired thickness.

Figure 9:
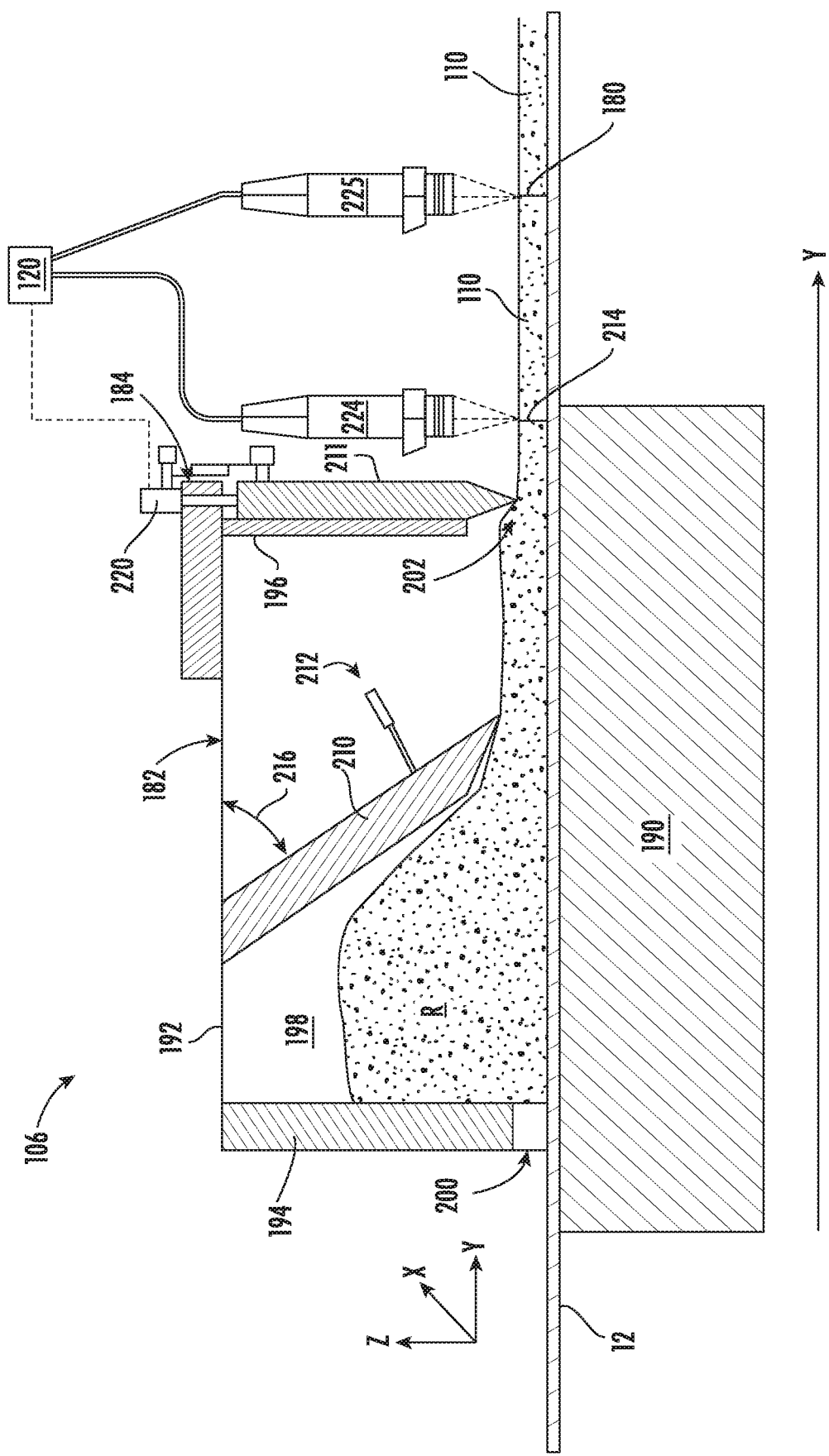
FIG. 9 is schematic view of the material depositor of FIG. 1 that includes an additional sensor.

Referring now to FIG. 9, there is shown an alternative configuration of the material depositor that includes a second sensor 225. The second sensor 225 is configured to determine a thickness 180 of the layer 110. The second sensor 225 is also connected to the controller 120 and is configured similarly to the first sensor 224 such that the controller 120 receives a second measuring signal from the second sensor 225 that is indicative of the thickness at a point downstream of the first sensor 224. As shown in FIG. 9, the second sensor 225 is directly downstream of, in series with, the first sensor 224. As such, the second sensor provides additional data regarding the thickness of layer 110. Such additional data can be impacted by factors such as flow or self-leveling of layer 110 and or drying of layer 110. It should be appreciated that the data taken by the second sensor 225 for a given location is spaced apart in time from when data was taken for that given location by the first sensor 224 by a predetermined delay. The amount of the delay is determined by the distance the second sensor 225 is from the second doctor blade 211. For example, if the second sensor 255 is 2 meters downstream from the doctor blade 211 and the film 12 is traveling at a velocity V of 1 meter per second, the delay is 2 seconds. During this time, the thickness at the particular point could change due to settling, flowing out, evaporation, or some other process. Thus, data from the second sensor 225 can be used to determine whether or not expected processes such as settling out have occurred and to confirm that the thickness is acceptable.

Figure 10:
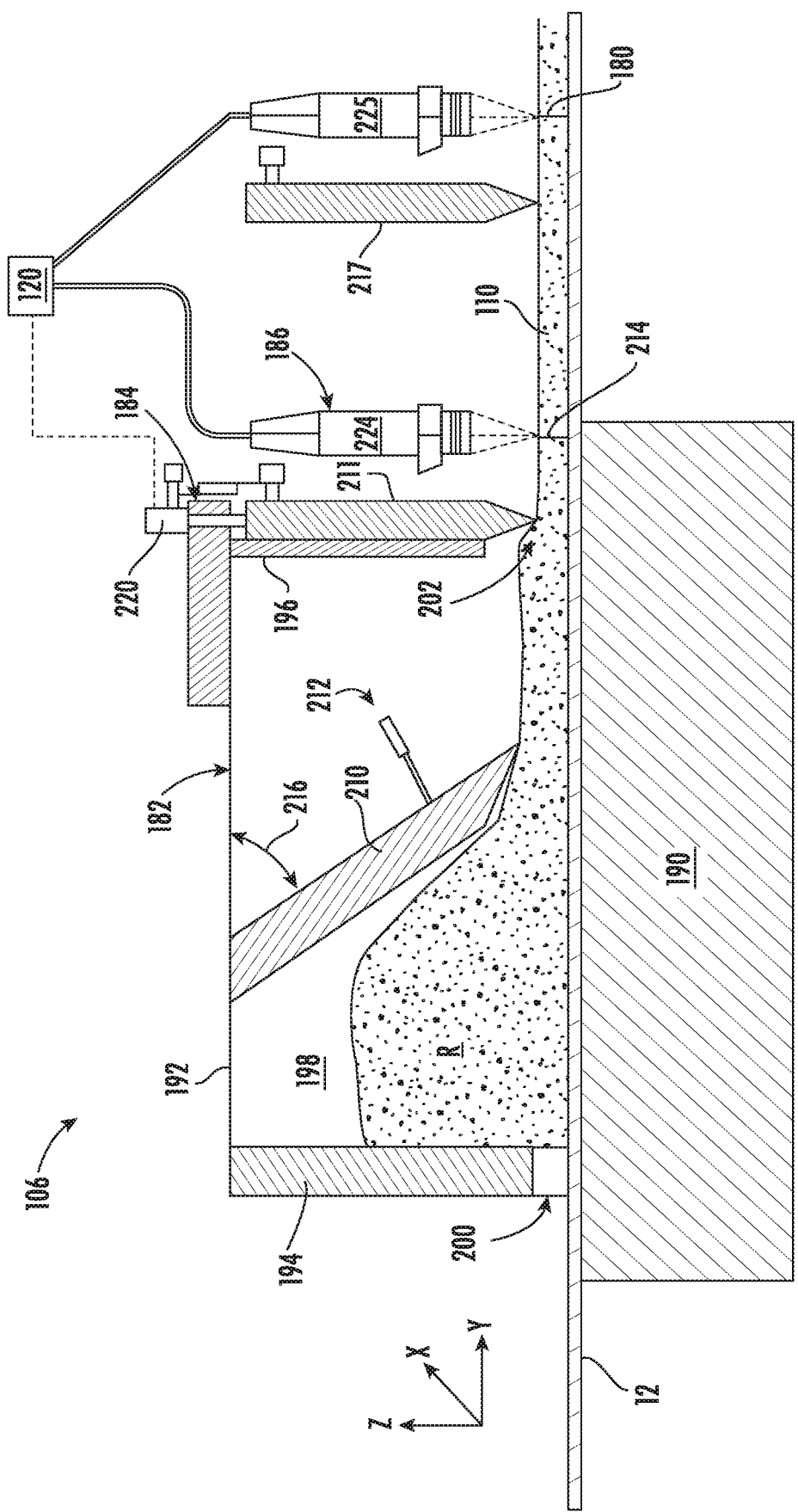
FIG. 10 is schematic view of the material depositor of FIG. 1 that includes two sensors and two control mechanisms.

Further, the second measuring signal from the second sensor 225 can provide data that is used in combination with data from the first sensor 224, for example as an average. Alternatively, the second sensor 225 can be controllingly coupled to a third doctor blade 217 via the controller 120 in a cascading closed loop strategy, as illustrated in FIG. 10. Alternatively or in addition, the data from sensor 225 can be used to determine that intentional changes to the thickness of the material layer 110 (e.g. to construct a different portion of the part 74) have been properly executed (has the expected thickness) and that the new layer thickness will reach the build zone 23 when expected.

Figure 11:
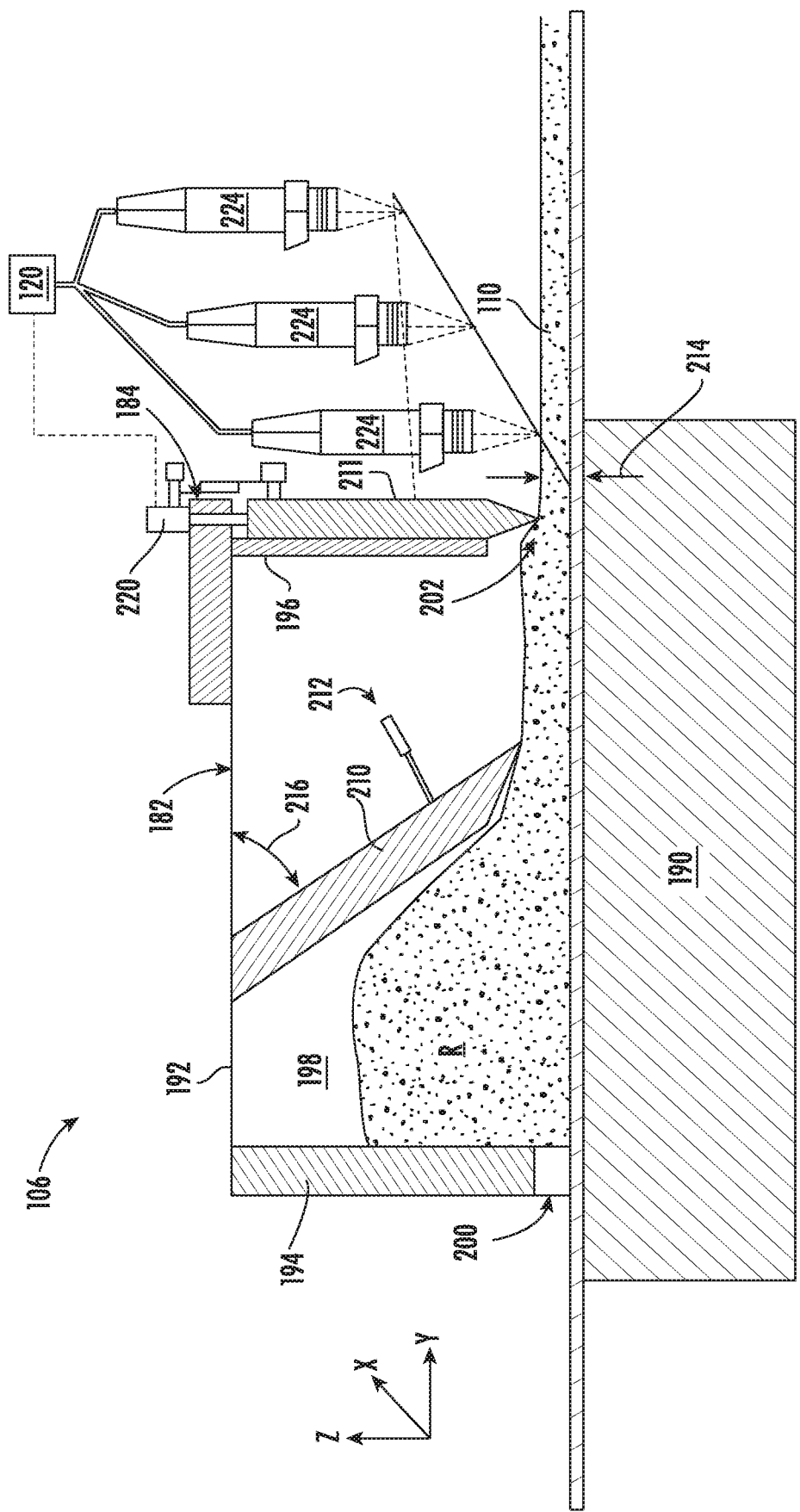
FIG. 11 is a schematic view of a material depositor according to another embodiment being configured for side-to-side thickness control of a deposited layer.
Figure 22:
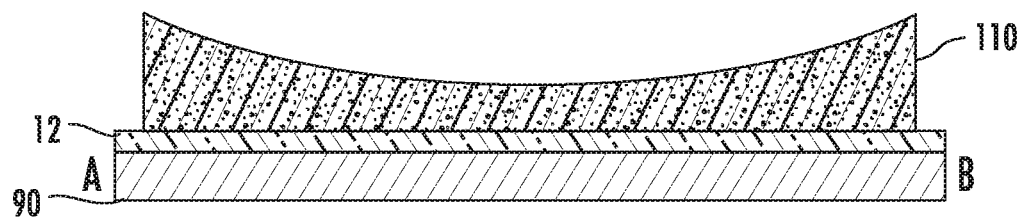
FIG. 22 shows a cross-section of a deposited layer of resin indicating one possible profile.
Figure 23:
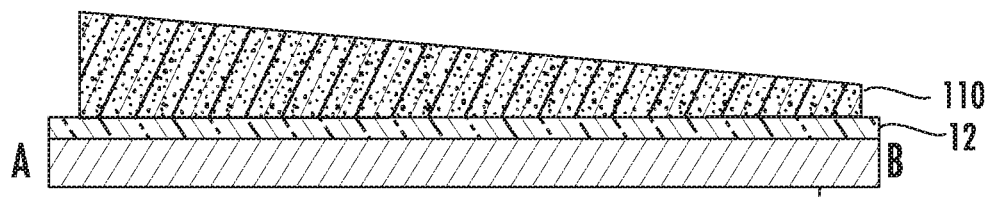
FIG. 23 shows a cross-section of a deposited layer of resin indicating another possible profile.
Figure 24:
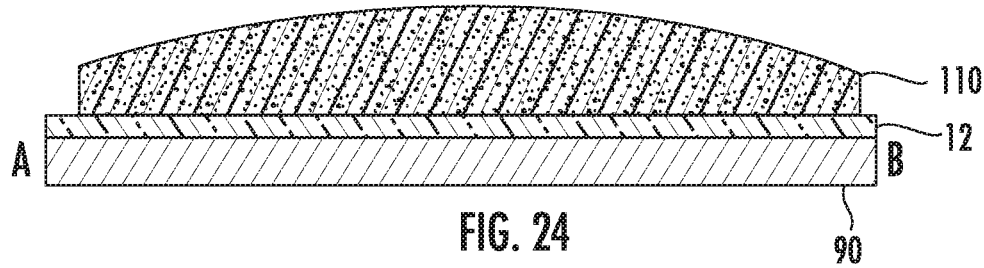
FIG. 24 shows a cross-section of a deposited layer of resin indicating another possible profile.
Figure 25:
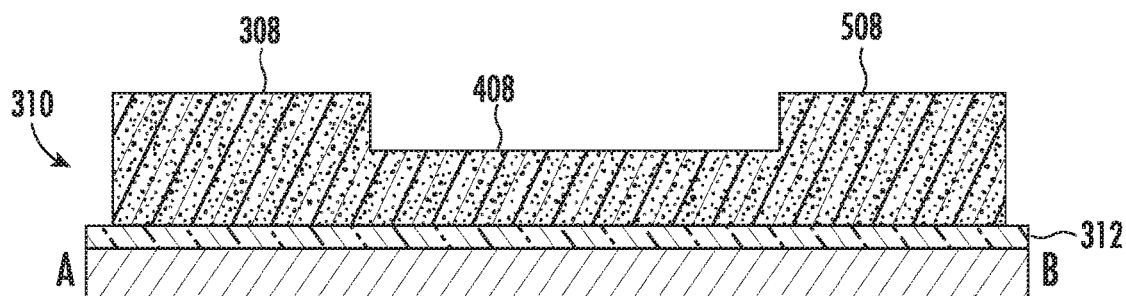
FIG. 25 shows a cross-section of a deposited layer of resin indicating another possible profile.
Figure 26:
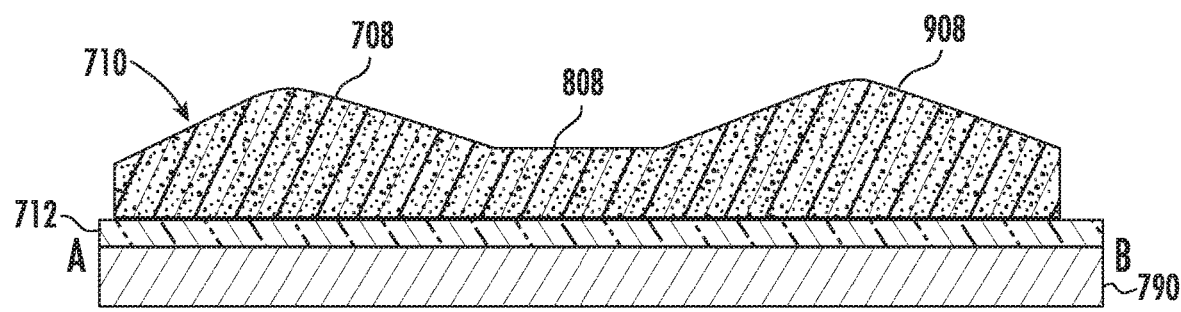
FIG. 26 shows a cross-section of a deposited layer of resin indicating another possible profile.

Referring now to FIG. 11, there is shown a configuration of material depositor 106 that includes multiple first sensors 224. As shown, such multiple first sensors 224 can be configured to provide average thickness information across the width of the layer 110. Alternatively, each of the first sensors 224 can provide independent thickness measuring signals. These independent signals can be used to determine variation in the thickness 214 of the layer 110 across the width of the layer 110. Such information can be used to control the thickness profile of the layer 110. For example, as shown, the multiple first sensors 224 are positioned with one generally at a first point. In the illustrated embodiment, the first point is spaced away from a first side A also referred to as the near side (in the foreground of FIG. 11), another at a second point that in the illustrated embodiment is generally at a center of the width of the layer 110, and another at a third point that, in the illustrated embodiment, is generally spaced-away from a second side B also referred to as an off side of the layer 110 (in the background of FIG. 11). The first, second and third points at which the multiple first sensors 224 are located define a line in the X or transverse direction that is substantially perpendicular to the edges of the layer 110. The first, second, and third points are associated with first, second, and third thicknesses respectively. It is generally desirable in additive manufacturing that the side-center-side profile of the layer 110 be flat. When the side-center-side profile is flat, the thickness 214 is consistent across the width of the layer 110 and the first, second and third thickness are generally equal. It should be appreciated that other profiles can be created utilizing material depositor 106. Examples of such profiles are shown in FIGS. 22-26. More specifically, FIG. 22 shows a smile profile; FIG. 23 shows a skewed profile which slopes from a thicker side in a generally straight line to a thinner side; FIG. 24 shows a frown or help profile; FIG. 25 shows a trough profile having two generally flat outside edges or lanes and a generally flat central trough; FIG. 26 shows a modified trough profile where the outside edges have high centers. It should be appreciated that other profile in other combinations of geometries can be produced utilizing depositor 106 or multiple depositors.

Figure 12:
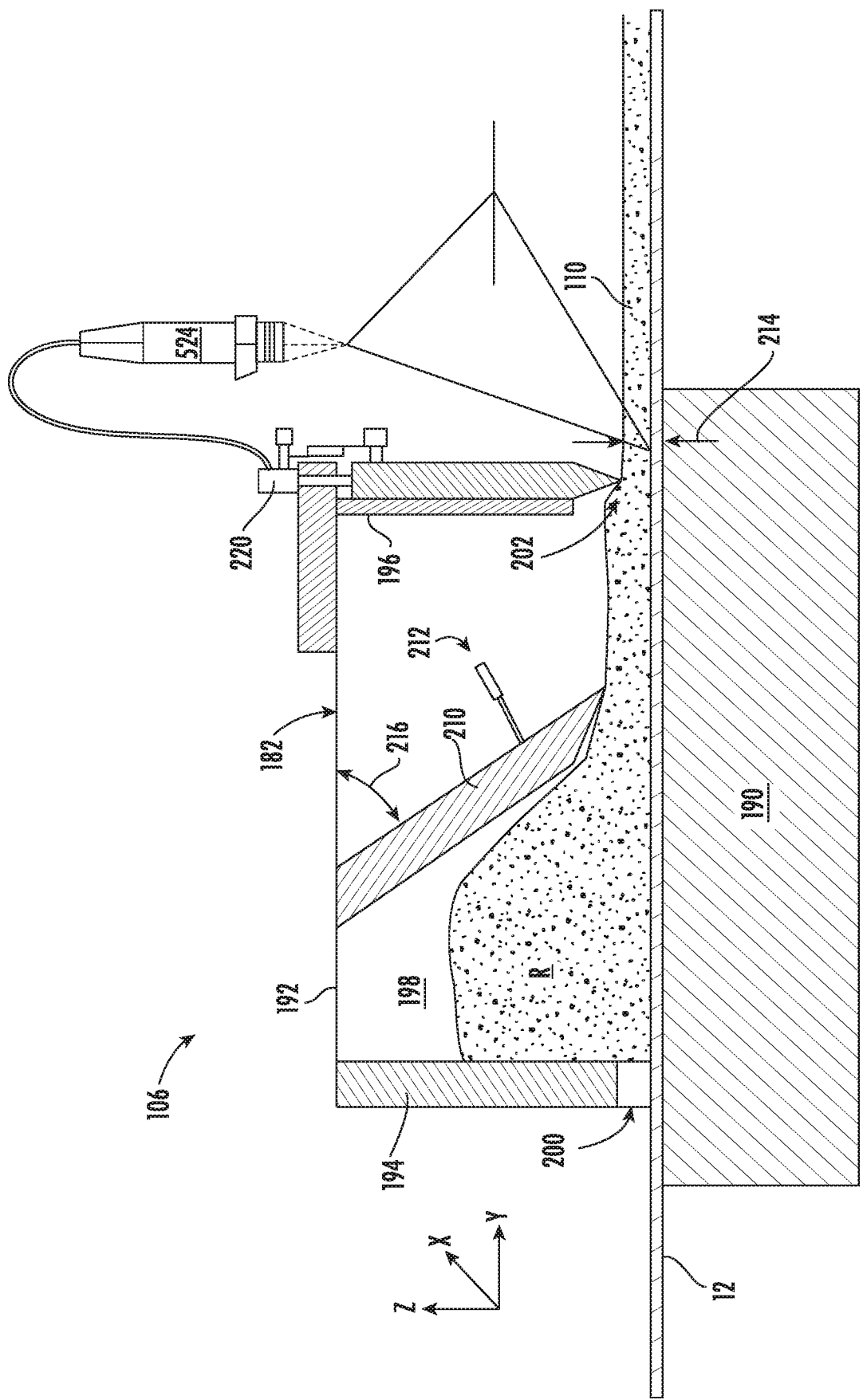
FIG. 12 is schematic view of the material depositor of FIG. 1 being configured for side-to-side thickness control of a deposited layer utilizing one sensor.
Figure 13:
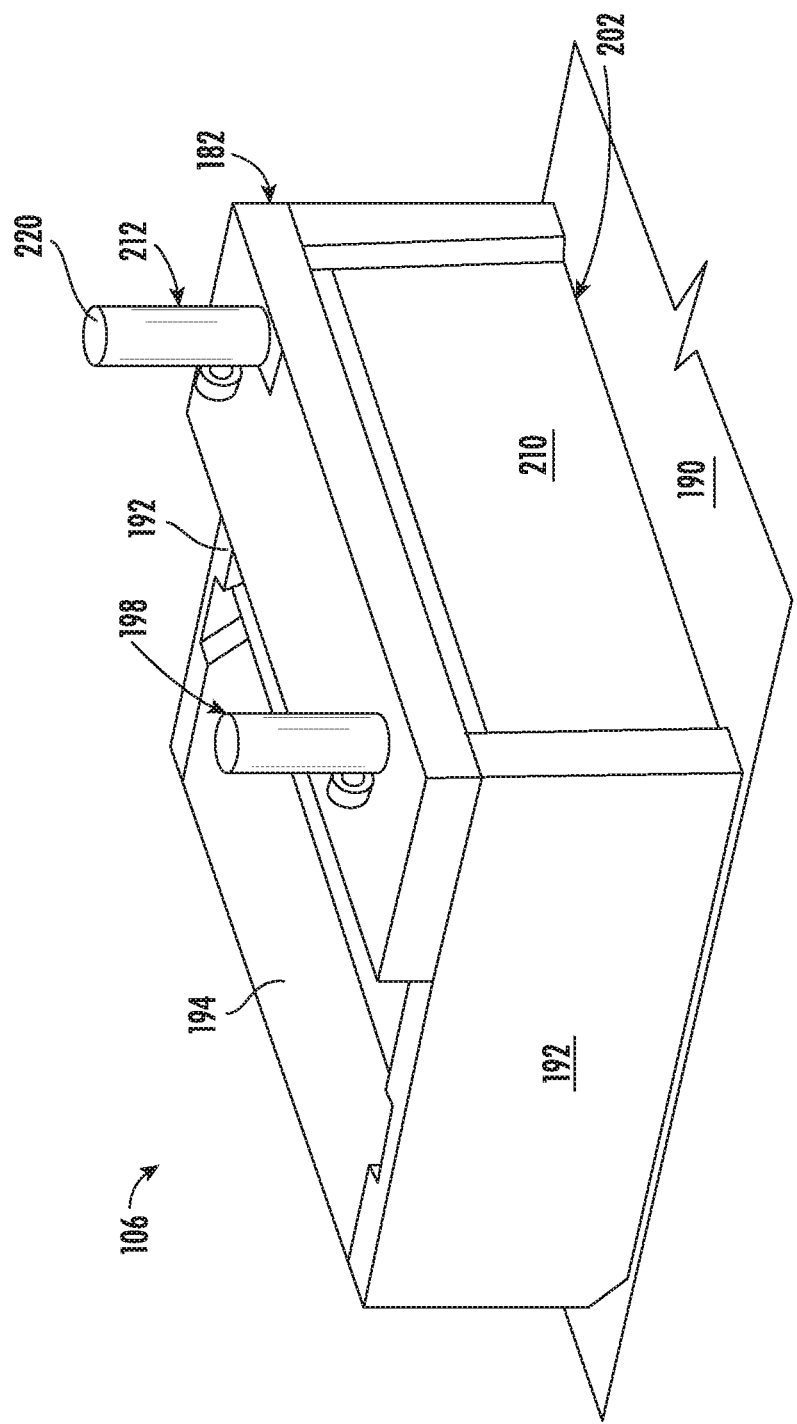
FIG. 13 is a schematic view of a material depositor.
Figure 14:
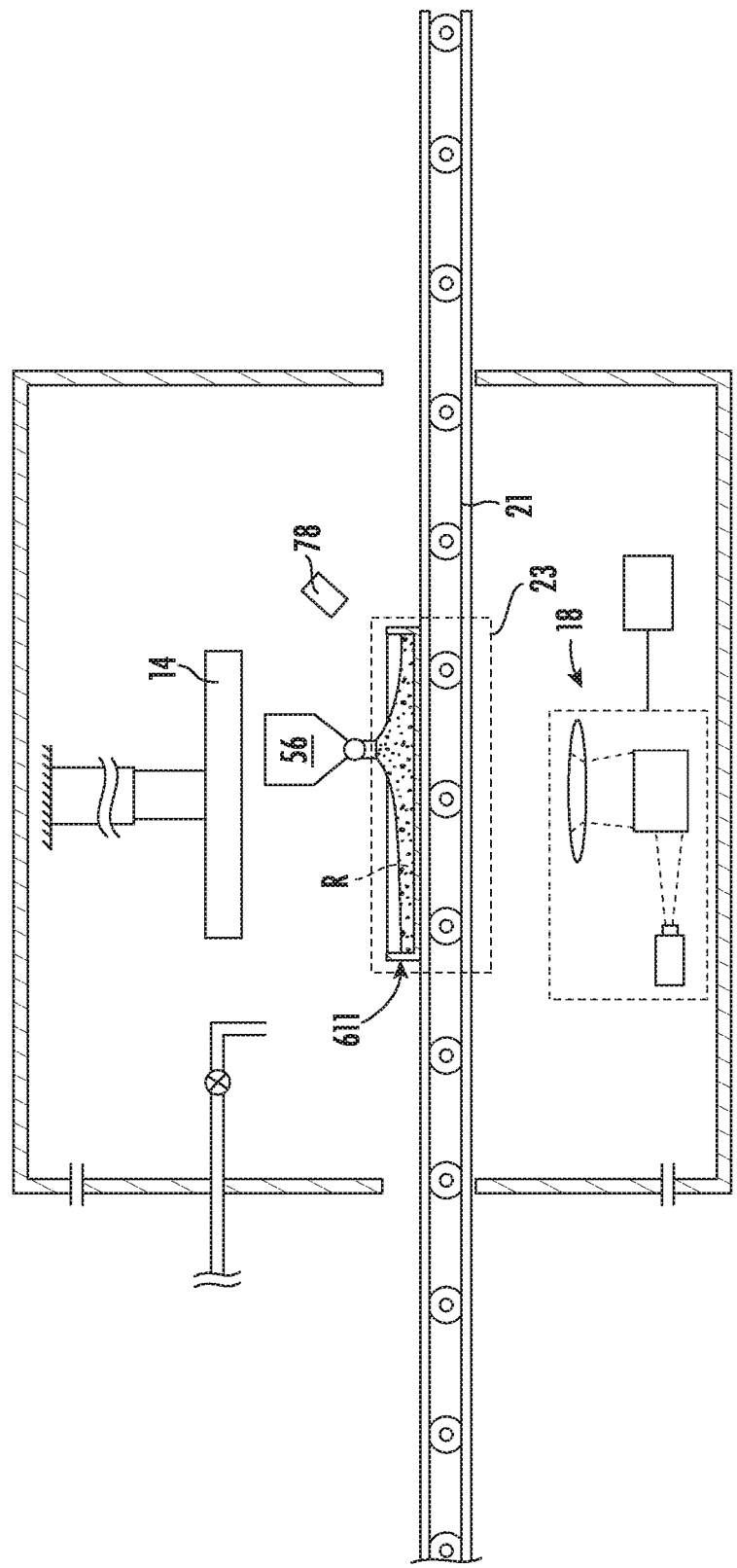
FIG. 14 is a schematic side elevation view of an exemplary vat-type additive manufacturing apparatus that includes a material depositor illustrating material being deposited in a vat.
Figure 15:
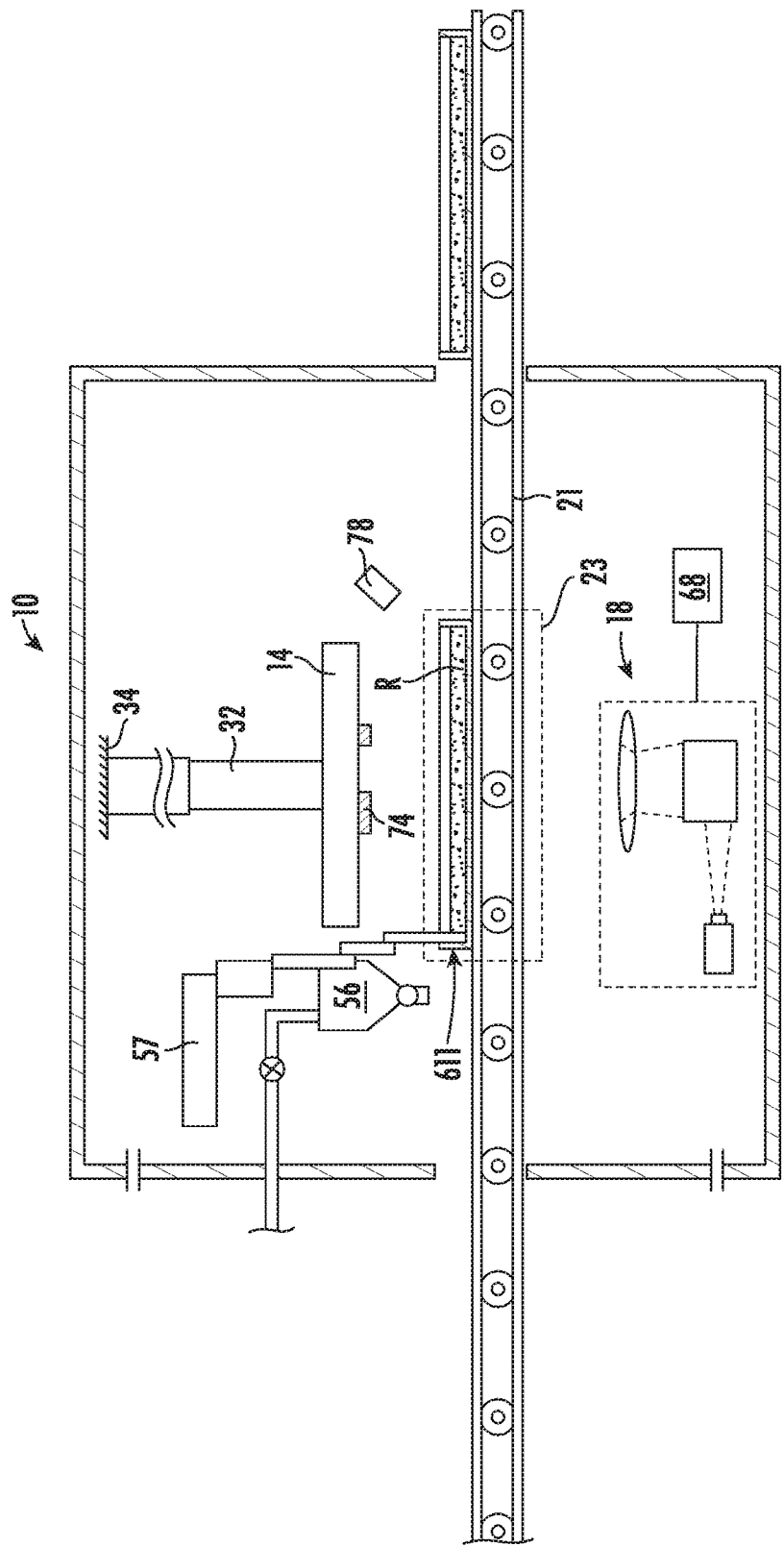
FIG. 15 is a view of the apparatus of FIG. 14, showing a suction device positioned to remove material after overfilling of a vat.
Figure 16:
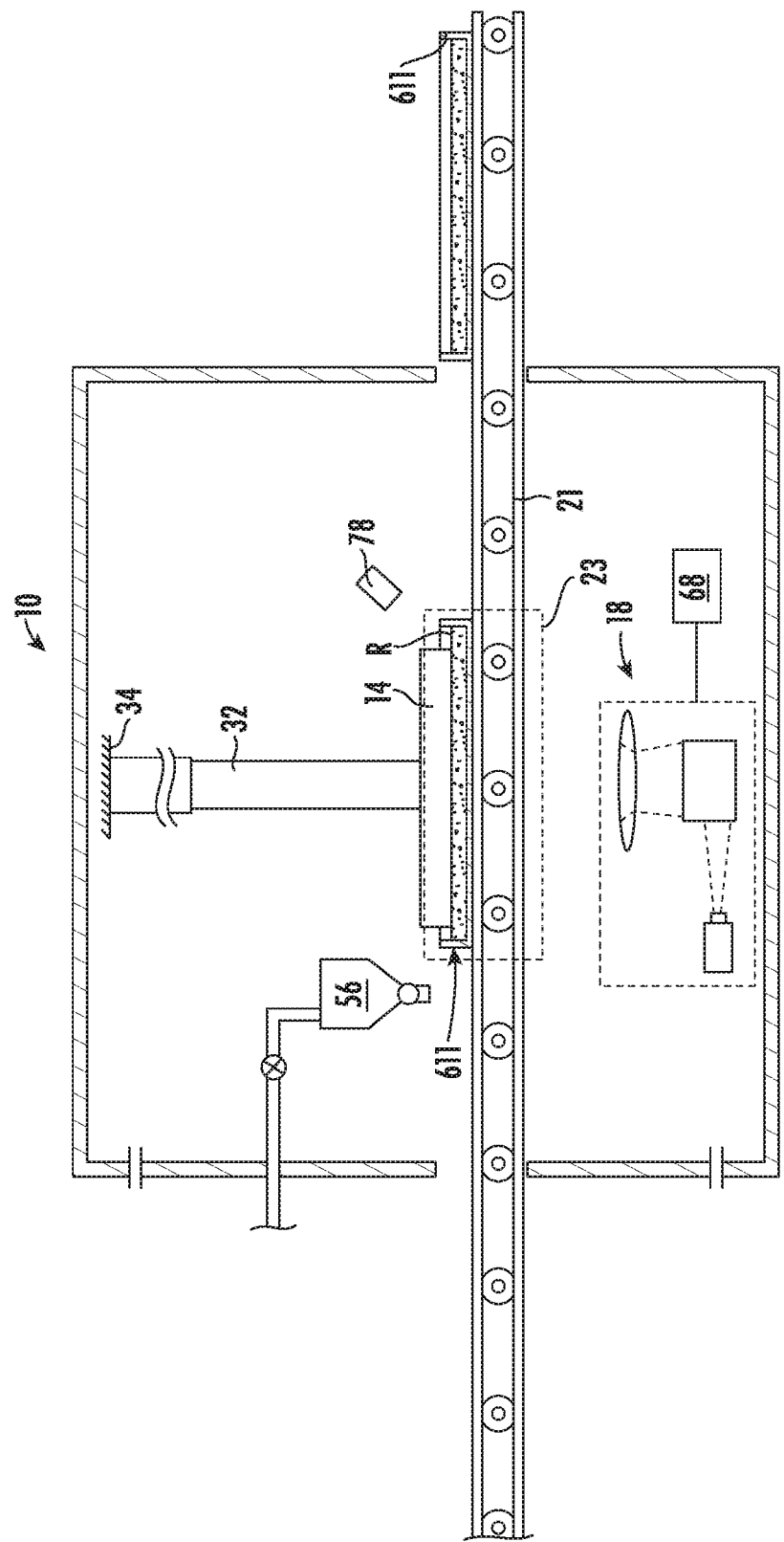
FIG. 16 shows a layer of resin being further defined by contact with a stage.

Referring now to FIGS. 11-13, there is shown a configuration of the material depositor 106 that includes a sensor 524 that is configured to scan across the width of the layer 110. The sensor 524 is connected to the controller 220 in the same manner as the first sensor 224 described above. The sensor 524 can be configured to provide average thickness across the width of layer 110 or a side-center-side thickness profile as discuss above in relation to the multiple first sensors 224 shown in FIG. 9. Continuing to refer to FIGS. 11-13, the material depositor can be configured with a second actuator 199 that is controllably connected to controller 120 in the same manner as actuator 220, described above. In this configuration, the first doctor blade 210 can be adjusted side to side to control the side-center-side profile referred to above. The first point can be controlled with regards to a first point target thickness, i.e., setpoint, the center can be controlled with regards to a second target thickness, and the third point can be controlled to a third target thickness. For example, if the thickness of the layer 110 measured at the first point by the associated first sensor 224 is greater than the first target thickness, the actuator 199 can be manipulated to make it thinner such that the measured thickness approaches the first side target thickness. It should be appreciated that all three target thicknesses can be different, the same, or other pattern such as "toothed" where each target thickness is different and three different general flat lanes are produced.

In another embodiment, the resin handling assembly 11 is a vat system. This embodiment is described, with relation to using vats 611, having a floor and walls to define a space which receives the resin. It should be appreciated that plates can be used in the system instead, so as to provide a floor but not walls. Generally, the resin R should be flowable when used with a vat system and less flowable when plates are used. According to the embodiment shown in FIGS. 14-17, the resin R is preferably a relatively low viscosity liquid that is self-levelling. The resin R can be a liquid having a higher viscosity such that contact with the stage 14 is required to level the resin R.

A conveyor 21 is used to move a fresh vat 611 into the build zone 23. A material depositor 56 operates to deposit resin R into the vat 611. A sensor 78 is provided to determine the thickness of the resin R in the vat 611. If the thickness of the resin R is not as much as required, controller 68 is configured to cause the material depositor 56 to add additional resin R. If the thickness of resin R in vat 611 is too great, the controller 68 is configured to operate a suction device 57 to remove excess resin R. These processes are repeated until the vat 611 is properly filled with resin at a desired height, i.e., depth. For less flowable (stiffer) resins, these processes are repeated until the vat 611 is properly filled with resin at a desired height, i.e., depth, and is level (or flat) within a desired specification of flatness. In this manner, a specified region, i.e., the area within the vat 611 is measured and corrected (material R removed or added) until the thickness is correct. This is in contrast to the method indicated above wherein corrections are made to the layer 110 as it is being generated. Once a properly filled vat 611 is positioned in the build zone 23, exposure to the radiant energy selectively cures resin R as described above, and joins the new layer to the previously-cured layer. This cycle of preparing a vat 611, incrementing a layer, selectively curing, and unloading the vat 611 is repeated until the entire component 74 is complete.

Figure 18:
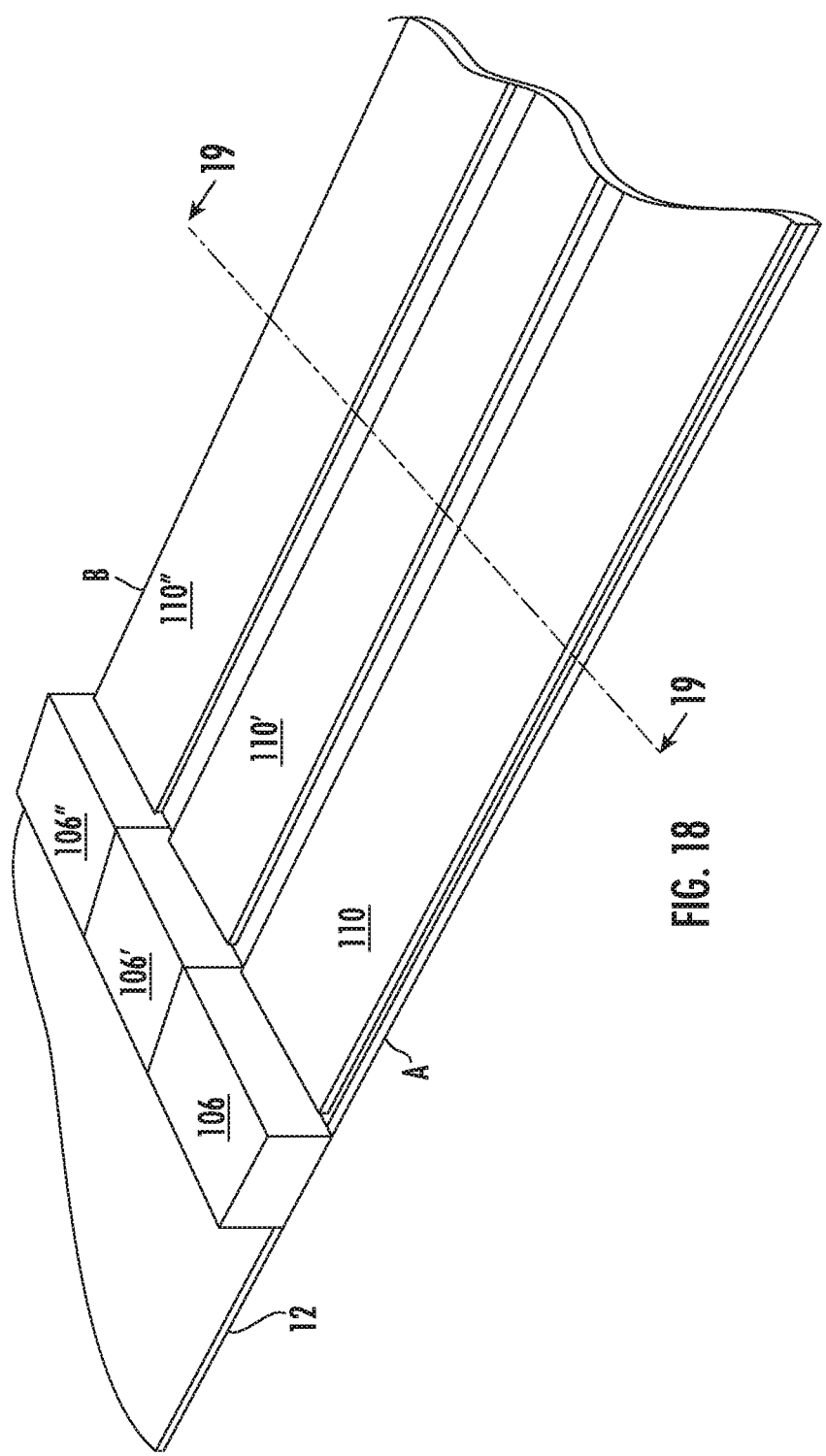
FIG. 18 shows a configuration of the apparatus of FIG. 1 in which three material depositors are positioned side by side to define three spaced-apart lanes.
Figure 19:
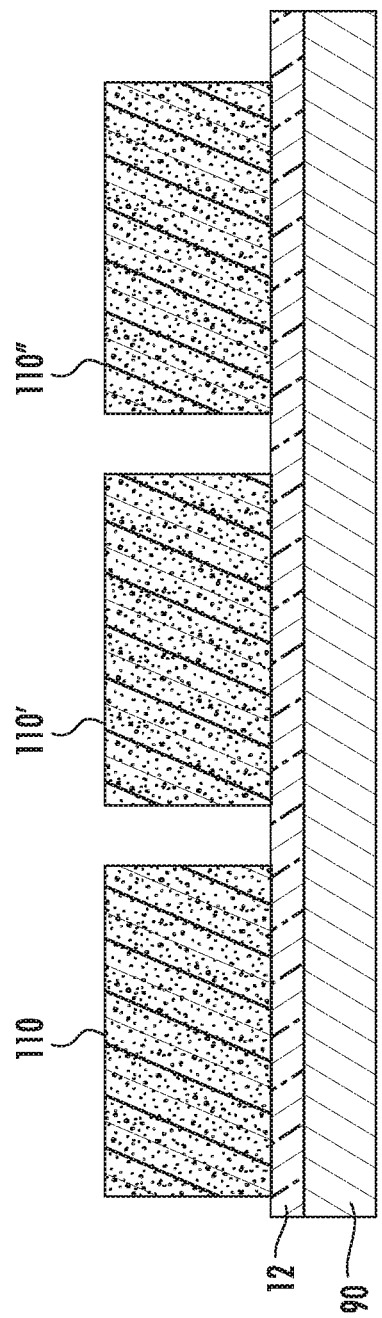
FIG. 19 shows a cross-section of three spaced-apart deposited layers of resin supplied by the configuration of the apparatus shown in FIG. 18 taken along line 19-19.

Referring now to FIG. 18, there is shown an alternative configuration of the apparatus 10 which includes multiple depositors. In this regard, a first depositor 106; a second depositor 106'; and a third depositor 106" are positioned adjacent to each other over the film 12. The multiple depositors are configured to deposit three spaced apart lanes of deposited material: a first lane 110, a second lane 110', and a third lane 110". As shown in FIG. 19, all three lanes 110, 110', and 110" have the same thickness. It should be appreciated that the three lanes 110, 110', and 110" are of the same material, resin R, but optionally the lanes 110, 110', and 110" can be formed of different materials.

Figure 20:
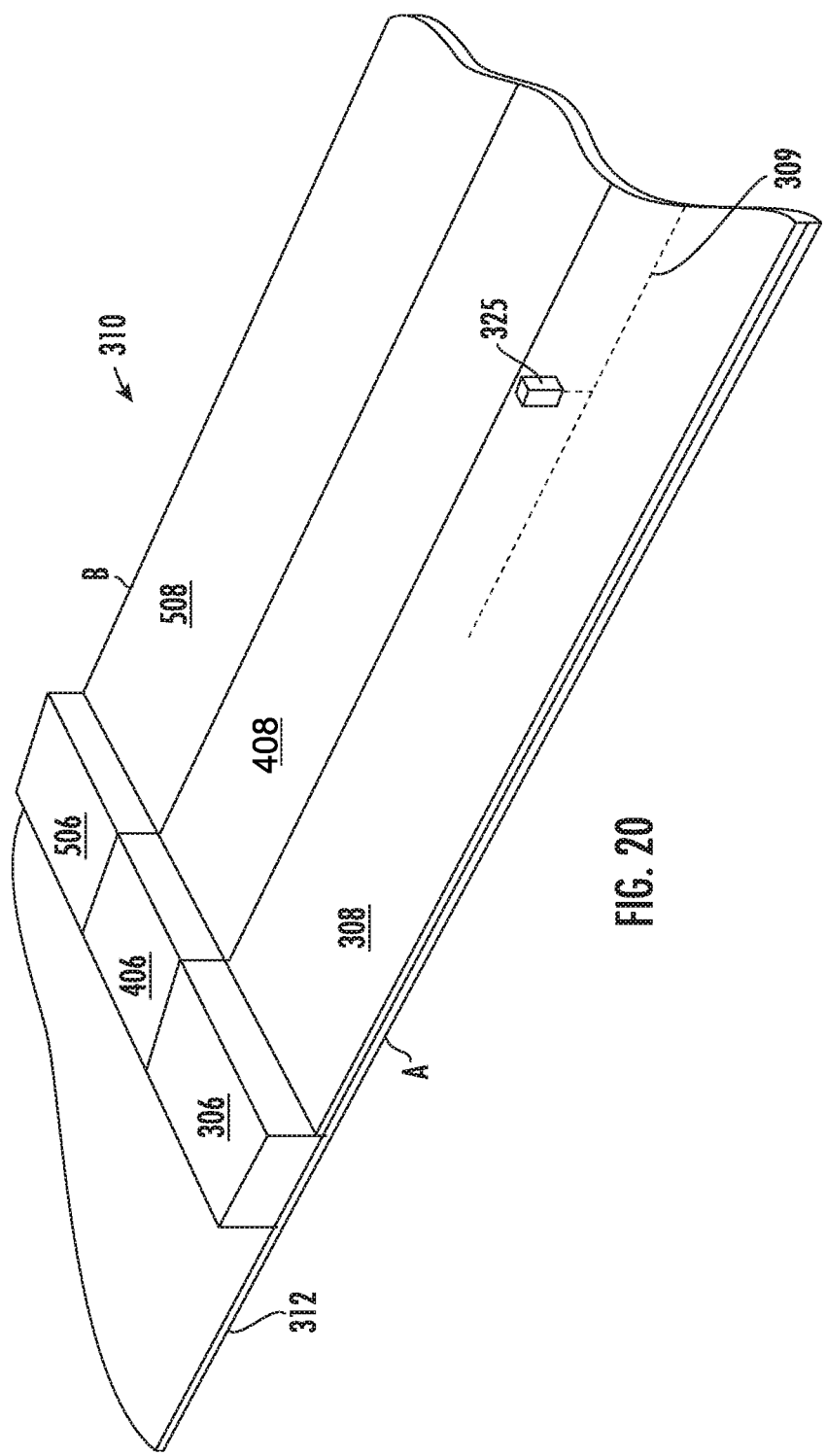
FIG. 20 shows an alternative embodiment that is configured to define three contiguous lanes of deposited resin.

Referring now to FIG. 20, there is shown an alternative embodiment of the additive manufacturing apparatus 310 in which a first material depositor 306, a second material depositor 406, and a third material depositor 506 are provided. The first, second, and third material depositors 306, 406, and 506 are substantially similar to the material 106 described above and can be understood from a description thereof. Each material depositor 306, 406, and 506 are configured to deposit resin R onto a moving belt 312 at a predetermined thickness. Alternatively, each depositor 306, 406, and 506 can include a different resin R and thus multiple materials can be used to build part 74.

As the belt 312 moves, the depositors 306, 406, and 506 operate to discharge resin R. In this manner, a first lane 308 having a first lane thickness, a second lane 408 having a second lane thickness, and a third lane 508 having a third lane thickness are produced. As shown in FIG. 20, lanes 308, 408, and 508 are touching and together define a layer 310. Optionally one or more of the lanes 308, 408, and 508 could be spaced apart. The spacing can be achieved by positioning the depositors 308, 408, and 508 or by utilizing the depositors to control the width of the deposited material. Thus, the spacing of the lanes 308, 408, and 508 can be controlled over time.

In the embodiment shown in FIG. 20, each of the three lanes are generally flat from side to side and the first lane thickness, the second lane thickness, and the third lane thickness are controlled relative to the same setpoint such that all three thicknesses are substantially equal. It should be appreciated that the thickness of lanes 308, 408, and 508 can be different from each other such that all three are different or one of the three are different from the other two. It should also be appreciated that the set points can be varied such that the thicknesses of lanes 308, 408, and 508 are varied over time.

A follow-up thickness sensor 325 is positioned downstream of the depositor 306 and is configured to measure the resin R thickness in the first lane 308 on the centerline 309 of the first lane 308. The follow-up thickness sensor 325 is configured to provide a signal indicative of thickness along the centerline 309 to the controller 68. The signal generated by the sensor 325 can be used to directly control the amount of material deposited by material depositor 306 or for confirmation. The spacing of sensor 325 and the speed of the film 312 downstream of the depositor 306 determines a predetermined time period between the moment that the measured material was deposited and the moment of measurement. It should be appreciated that multiple follow-up sensors can be utilized across layer 310 or within any one or more of the lanes 308, 408, and 508. It should be appreciated that, as shown in FIG. 20, the depositor 306, the depositor 406, and the depositor 506 are positioned such that they each discharge resin at about the same location across the film 312.

Figure 21:
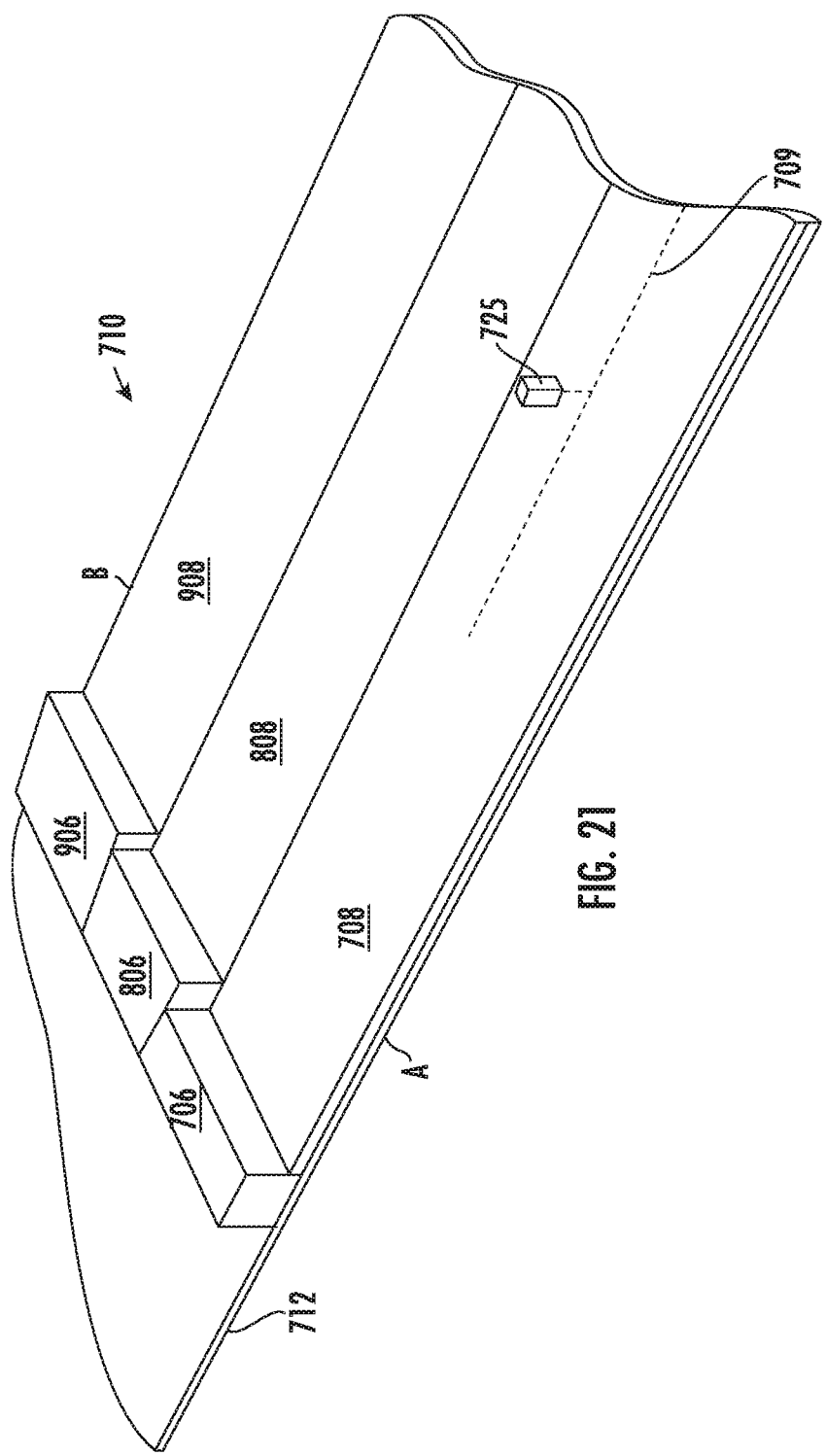
FIG. 21 shows another alternative embodiment that is configured to define three contiguous lanes of deposited resin.

As shown in FIG. 21, in another alternative embodiment, there is provided a depositor 706, a depositor 806, and they depositor 906. The depositors 706, 806, and 906 are configured to deposit layers 708, 808, and 908 respectively onto a film 712 and can be structurally and operationally understood from the description of the depositors 306, 406, and 506. It should be appreciated that the depositor 706 is configured to deposit resin that comprises a lane 708 further upstream i.e. earlier than a lane 808. Further, depositor 806 is configured to deposit resin that comprises the lane 808 further upstream i.e. earlier than lane 908. Such spacing of the depositors 706, 806, and 906 can allow for accommodations of mechanical structures associated with adjacent depositors. Such spacing can also allow for accommodations of mechanical and rheological properties of resin R in adjacent lanes 708, 808, and 908. Again, it should be appreciated that the adjacent lanes 708, 808, and 908 can be comprised of the same resins or different resins.

Referring now to FIGS. 26-29, an alternative embodiment is provided that is configured to create multiple thicknesses within a build layer to precisely create overhangs, internal voids, and other geometries. Such geometries are generally difficult to create using conventional means of additive manufacturing due to the print-through phenomena. Accordingly, a method of manufacture for operating a 3D printer utilizing additive manufacturing with build styles that allow the creation of multiple thicknesses within a layer is disclosed below.

Advantages of the disclosed method over methods of the prior art include improved production rates, the ability to create more fragile features, the ability to create voids, and greater precision. The disclosed method should provide layers that are created with the correct thickness such that the layers are cleaner and print-through does not occur because excess resin is not deposited. Another advantage of the disclosed method over the prior art is that the prior art often leaves the newly created void full of uncured material. Any uncured material that is not or cannot be removed during an in-process or post-printing cleaning step is cured into the part (thus, partially or completely filling the void) during postprocessing. The disclosed method creates internal features with little or no entrapped uncured material or resin R and therefore creates features that will survive postprocessing.

It should be noted that a feature of the present method is that all the layers that are printed at the same time and have their base in the same plane, i.e., on the surface 24 of film 12.

A part having voids defined within it can be produced according to the following method. It should be appreciated that the voids can be channels through the part that have open ends, enclosed cavities, partially enclosed cavities balance only on one or two sides, i.e., overhangs, or other complex geometries.

Such parts can be created by stacking one or more layers having shaped or otherwise non-flat profiles. Such shaped layers can be interspersed with conventional flat layers.

Figure 28:
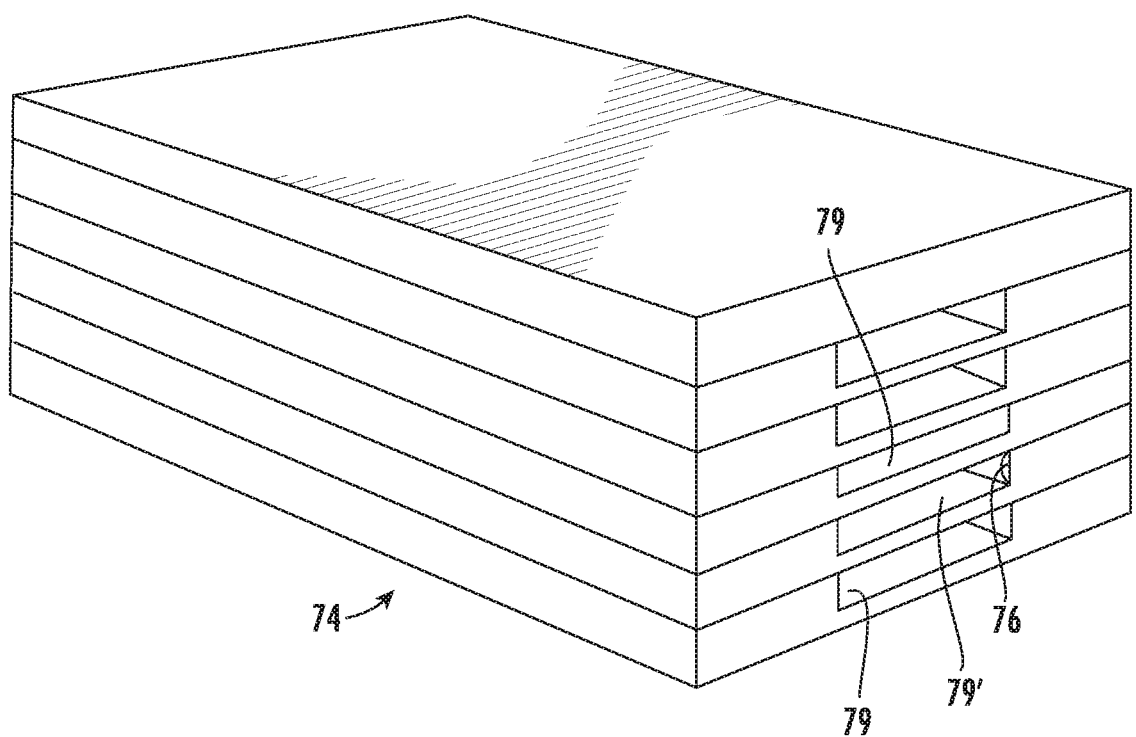
FIG. 28 shows a perspective view of an in-process part made according to the method disclosed herein showing individual cured layers.
Figure 29:
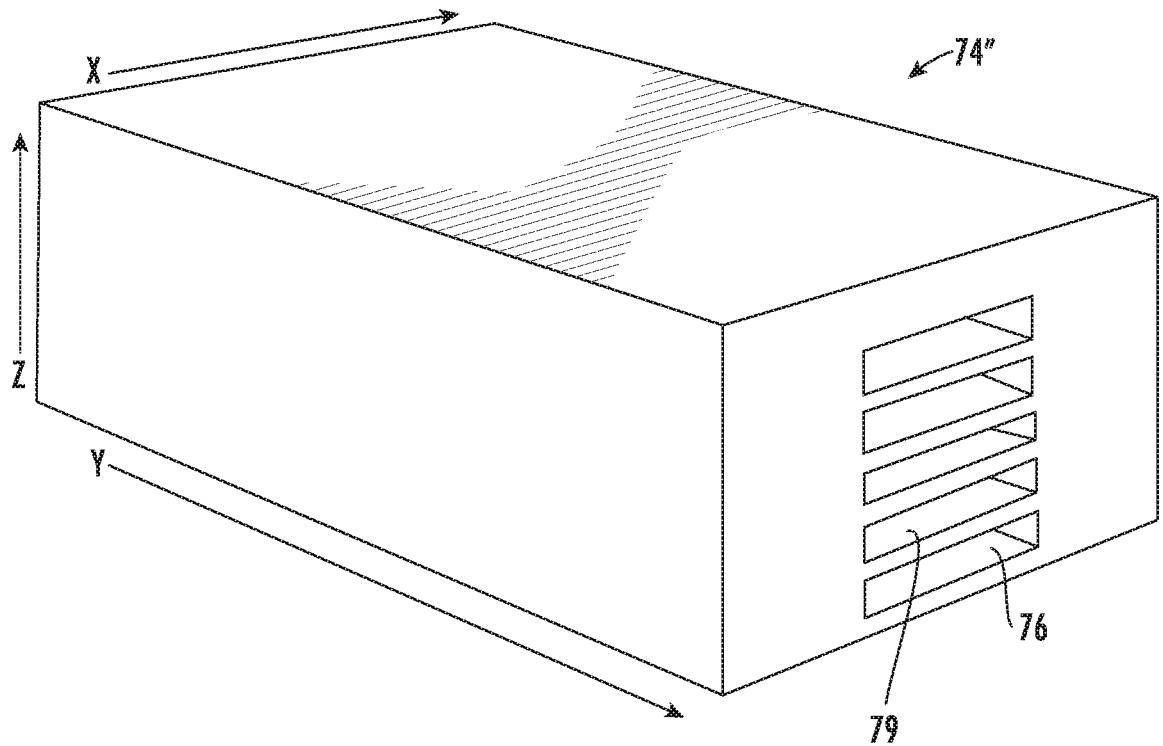
FIG. 29 shows a perspective view of a finished part made according to the method disclosed herein.

For example, the in-process part shown in perspective in FIG. 28 is formed of five U-shaped build layers 79 formed on an initial build layer having a generally uniform thickness. The in-process part 74 defines the finished part 74". It should be appreciated that optionally, conventional cleaning and finishing steps can be applied to the in-process part 74 to produce the finished part 74".

Preferably, the in-process part 74 is formed utilizing a U-shaped layer 310 being configured as shown in FIG. 25 with square outside lanes 308 and 508. Such precisely deposited shaped layers allow for the formation of a part without print-through. Because the layer 310 shown in FIG. 25 does not have excess resin, it is not possible to have print-through errors. In other words, the profile of the layer 310 generally matches that of the resulting build layer of the finished part.

Figure 27:
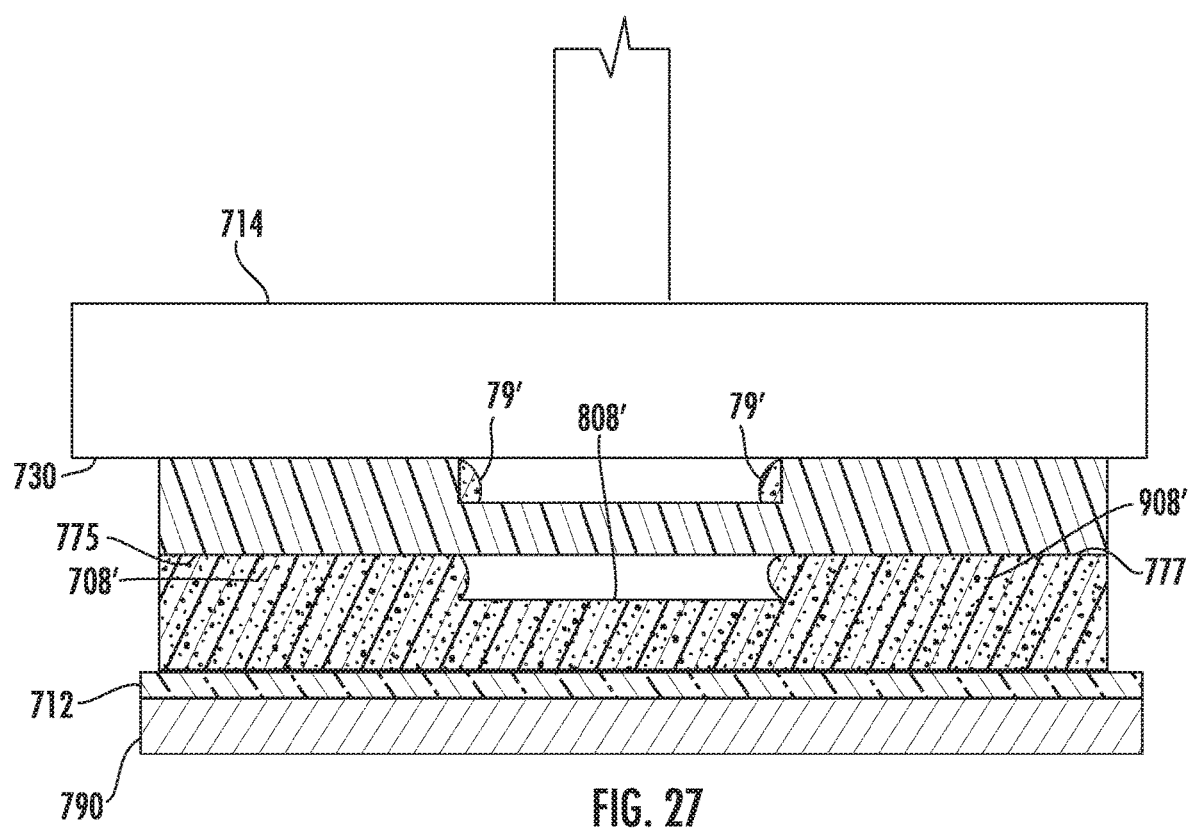
FIG. 27 shows the deposited layer of resin shown in FIG. 26 in contact with a working process part prior to curing of the deposited layer according to one disclosed method.

However, it should be appreciated that similar parts having cavities within them can be formed utilizing stacked shaped layers where the profile of the deposited layer does not match the finished build layer shape. As indicated above, the stage 14 can be utilized to contact a deposited layer in such a way that the surface 30 of the stage 14 contacts the deposited layer 110 and defines its uppermost surface. For example, FIG. 26 shows a shaped layer 710 having two outside ridges 708 and 908. According to the present method, a shaped layer 710 can be utilized to make the part 74 shown in FIG. 28. An initial step of defining the final uncured layer shape by moving the working surface 75 to contact and deform the deposited uncured resin layer 710 as shown in FIG. 27 is provided. This step is utilized to approximate the precisely deposited U-shaped channel shown in FIG. 25.

In this regard, the uncured resin layer 710 of FIG. 26 includes a generally flat center lane 808 bounded by peaked first and second outside lanes 708 and 908. The shape and size of the peaks of the outside lanes 708 and 908 are chosen to comply with the build style and account for deformation of the outside lanes 708 and 908 by contact with the surface 30 of the stage 14 to define an approximation of one of the desired U-shaped layers as shown in FIG. 28. Due to the mechanical deformation process required to shape the outside ridges 708, 908 it should be appreciated that some uncured resin 79' might be left within the channel 79. This uncured resin 79' can be removed by various conventional cleaning processes such as chemical flushing. Cleaning steps can be conducted on the working process part 74 or as part of the finishing processes to produce the finished part 74" shown in FIG. 29. While the step of mechanically deforming the deposited layer prior to curing can produce the desired finished shape, it can also produce some waste and possible print-through artifacts.

The alternative embodiment described above provides a method for using an apparatus for additive manufacturing to produce a three-dimensional part that includes a void. As used herein, the term void refers to a space within a build layer that is defined by an uncured resin layer that has various thicknesses. In this regard, the uncured resin layer that defines a build layer with a void has at least one "thinner" region. The method can be better understood from the listing of the steps below: A) depositing an uncured layer of resin that defines a resin surface and a resin base that are spaced apart a thickness and wherein the uncured layer of resin includes multiple thicknesses such that a first uncured layer profile is defined; B) curing the layer of resin to create a build layer that is a component of the part; C) wherein the build layer has a build layer profile that defines at least a portion of the void; and D) repeating the depositing and curing steps to create a part that includes multiple build layers and that includes the void and the void has a predetermined geometry.

According to an alternative embodiment the following steps are provided to create a part having a void where the deposited layers are shaped by contact with the mechanical shaper such as the stage 14. The steps of the alternative embodiment method are: E) contacting at least a portion of the resin surface with a working surface; F) changing the first uncured layer profile to define a second uncured layer profile during the step of contacting; G) cleaning residual uncured resin from the part and H) removing undesired cured resin to define a final part shape.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An additive manufacturing apparatus, comprising:
a build surface at least a portion of which is transparent configured to move in a downstream direction;
a first material depositor operable to deposit a curable resin to form a deposited resin layer on the build surface, the deposited resin layer being transported in the downstream direction by the build surface;

a stage positioned facing the build surface and configured to hold a stacked arrangement of one or more cured layers of the resin;

one or more actuators operable to change the relative positions of the build surface and the stage;

a radiant energy apparatus positioned adjacent to the build plate opposite to the stage, and operable to generate and project radiant energy on the resin through the build plate in a predetermined pattern;

a first sensing device configured to measure the thickness of the deposited resin layer, wherein the at least one first sensing device is configured to generate a signal indicative of the thickness of the deposited resin layer;

a first thickness adjusting mechanism configured to adjust the thickness of the deposited resin layer in response to the signal; and an adjustment device configured to adjust the first thickness adjusting mechanism.

2. The additive manufacturing apparatus of claim 1, wherein the first thickness adjusting mechanism is one of: a suction device and a doctor blade.

3. The additive manufacturing apparatus of claim 1, comprising a second thickness adjusting mechanism.

4. The additive manufacturing apparatus of claim 3, wherein the second thickness adjusting mechanism is positioned downstream of and in series with the first thickness adjusting mechanism.

5. The additive manufacturing apparatus of claim 1, wherein the first sensing device is positioned downstream of the first thickness adjusting mechanism.

6. The additive manufacturing apparatus of claim 5, wherein the first sensing device is positioned upstream of a second thickness adjusting mechanism.

7. The additive manufacturing apparatus of claim 6, wherein the second thickness adjusting mechanism is positioned upstream of a second sensing device that is configured to measure the thickness of the deposited resin layer.

8. The additive manufacturing apparatus of claim 1, wherein there is a first and second sensing device and a second thickness adjusting mechanism that is positioned downstream of the second sensing device.

9. The additive manufacturing apparatus of claim 1, wherein the thickness adjusting mechanism is configured to adjust the thickness of the deposited layer across a width of the deposited layer such that the thickness is maintained approximately equal to a thickness target.

10. The additive manufacturing apparatus of claim 9, wherein the deposited layer has a first thickness target and a second thickness target and the first thickness target is different from the second thickness target.

11. The additive manufacturing apparatus of claim 9, wherein the thickness adjusting mechanism is configured to be actuated based on at least one signal indicative of the thickness of the deposited layer at a plurality of points positioned across the width of the deposited layer.

12. The additive manufacturing apparatus of claim 11, wherein the plurality of points define a line that is oriented generally perpendicular to the sides of the deposited layer.

13. A method for producing a component layer-by-layer using an additive manufacturing apparatus, comprising the steps of:

maintaining a thickness of a layer of resin which is radiant-energy-curable at a predetermined thickness, by the steps of:

using a first material depositor to deposit the resin to form a deposited resin layer on a build surface configured to move in a downstream direction, at least a portion of which is transparent, the deposited resin layer being transported in the downstream direction by the build surface;

sensing the thickness of the deposited resin layer;

adjusting the thickness of the deposited resin layer to define a region of the deposited layer that has a predetermined thickness;

positioning the region of the deposited layer having a predetermined thickness in a build zone;

executing a build cycle, including the steps of:

positioning a stage relative to the build surface so as to define a layer increment in the deposited resin layer;

selectively curing the resin using an application of radiant energy in a specific pattern so as to define the geometry of a cross-sectional layer of the component;

moving the build surface and the stage relatively apart so as to separate the component from the build surface;

repeating the steps of maintaining the thickness and executing the build cycle, for a plurality of layers until the component is complete;

using a first thickness adjusting mechanism configured to adjust the thickness of the deposited resin layer in response to the sensed thickness in the adjusting the thickness step; and using an adjustment device configured to adjust the first thickness adjusting mechanism in the adjusting the thickness step.

14. The method of claim 13, wherein the step of positioning the region of the deposited layer includes the step of passing another region of the deposited layer having a thickness that is less than the predetermined thickness through the build zone.

15. The method of claim 14, wherein the additive manufacturing apparatus includes a second thickness adjusting mechanism.

16. The method of claim 15, wherein the second thickness adjusting mechanism is positioned downstream of and in series with the first thickness adjusting mechanism.

17. The method of claim 14, further comprising the step of measuring thickness with a first sensing device that is positioned downstream of the first thickness adjusting mechanism.

18. The method of claim 15, further comprising the step of utilizing a second device to measure the thickness of the deposited layer wherein the second thickness adjusting mechanism is positioned upstream of the second sensing device.

19. The method of claim 18, further comprising the step of monitoring a thickness of resin R for a predetermined time after it was deposited.

20. The method of claim 19, further comprising the step of utilizing the second sensing device to determine the thickness of the deposited resin layer a predetermined time after it was deposited.

21. The method of claim 13, wherein the thickness adjusting device is configured to adjust the thickness of the deposited layer across a width of the deposited layer.

22. The method of claim 18, wherein the thickness adjusting device is actuated based on at least one signal indicative of the thickness of the deposited layer at a plurality of points positioned across the width of the deposited layer.

* * * * *